United States Patent
Fukuda et al.

(10) Patent No.: US 11,630,402 B2
(45) Date of Patent: Apr. 18, 2023

(54) PARTICLE CONVEYING DEVICE AND IMAGE FORMING APPARATUS

(71) Applicant: FUJIFILM Business Innovation Corp., Tokyo (JP)

(72) Inventors: Yusuke Fukuda, Kanagawa (JP); Naoki Ota, Kanagawa (JP); Masataka Kuribayashi, Kanagawa (JP); Takafumi Koide, Kanagawa (JP); Katsuyuki Kitajima, Kanagawa (JP); Makoto Kamisaki, Kanagawa (JP); Tatsuhiro Igarashi, Kanagawa (JP); Yasuhisa Morooka, Kanagawa (JP); Shota Oshima, Kanagawa (JP); Yuma Kubo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 151 days.

(21) Appl. No.: 17/170,185

(22) Filed: Feb. 8, 2021

(65) Prior Publication Data
US 2022/0091542 A1 Mar. 24, 2022

(30) Foreign Application Priority Data
Sep. 18, 2020 (JP) ............................ JP2020-157928

(51) Int. Cl.
B65G 33/08 (2006.01)
C09J 125/14 (2006.01)
(Continued)

(52) U.S. Cl.
CPC ......... *G03G 15/0891* (2013.01); *B65G 33/14* (2013.01); *C09J 125/14* (2013.01);
(Continued)

(58) Field of Classification Search
None
See application file for complete search history.

(56) References Cited

U.S. PATENT DOCUMENTS 4,825,244 A * 4/1989 Hediger ............. G03G 15/0822
399/255
4,906,104 A * 3/1990 Nishise ................... B29C 45/33
366/322
(Continued)

FOREIGN PATENT DOCUMENTS

JP 8-30097 A 2/1996
JP 11-315994 A 11/1999
(Continued)

*Primary Examiner* — Kavel Singh
(74) *Attorney, Agent, or Firm* — Sughrue Mion, PLLC

(57) ABSTRACT

A particle conveying device includes a storage portion that stores pressure sensitive adhesive particles that contain at least a binder resin, have a pressure-induced phase transition property, and have a sulfur content in a range of 0.1 mass % or more and 0.5 mass % or less relative to the entire pressure sensitive adhesive particles as measured by X-ray fluorescence; and a conveying member that is disposed in the storage portion and rotates about a shaft that extends in one direction inside the storage portion to thereby convey the pressure sensitive adhesive particles in a direction along the shaft inside the storage portion.

15 Claims, 7 Drawing Sheets

(51) Int. Cl.
 *G03G 15/08* (2006.01)
 *G03G 15/06* (2006.01)
 *G03G 9/08* (2006.01)
 *G03G 9/087* (2006.01)
 *B65G 33/14* (2006.01)

(52) U.S. Cl.
 CPC .......... *G03G 9/08711* (2013.01); *B65G 33/08* (2013.01); *G03G 2215/0607* (2013.01); *G03G 2215/0636* (2013.01)

(56) References Cited

U.S. PATENT DOCUMENTS

| | | | |
|---|---|---|---|
| 5,146,277 A * | 9/1992 | Fox | G03G 15/0822 222/DIG. 1 |
| 5,629,758 A * | 5/1997 | Kageyama | G03G 15/0822 366/319 |
| 6,132,915 A | 10/2000 | Yoshino et al. | |
| 7,801,469 B2 | 9/2010 | Uezono | |
| 7,941,073 B2 | 5/2011 | Takagi et al. | |
| 8,298,740 B2 * | 10/2012 | Kim | G03G 9/08797 430/108.8 |
| 8,369,751 B2 * | 2/2013 | Ichikawa | G03G 15/0872 399/254 |
| 8,426,097 B2 * | 4/2013 | Shin | G03G 9/0819 430/108.7 |
| 10,507,681 B2 | 12/2019 | Uehara et al. | |
| 10,828,923 B2 | 11/2020 | Uehara et al. | |
| 11,003,102 B2 * | 5/2021 | Ishiduka | G03G 5/075 |
| 2019/0292412 A1 | 9/2019 | Yamasaki et al. | |
| 2022/0091522 A1 * | 3/2022 | Ota | C08F 220/1804 |

FOREIGN PATENT DOCUMENTS

| | | |
|---|---|---|
| JP | 2000-231226 A | 8/2000 |
| JP | 2008-155412 A | 7/2008 |
| JP | 2008-281806 A | 11/2008 |
| JP | 2010-271466 A | 12/2010 |
| JP | 2011-102893 A | 5/2011 |
| JP | 5115015 B2 | 1/2013 |
| JP | 2018-2889 A | 1/2018 |
| JP | 2018-4966 A | 1/2018 |
| JP | 2018-163198 A | 10/2018 |
| JP | 2019-167471 A | 10/2019 |

* cited by examiner

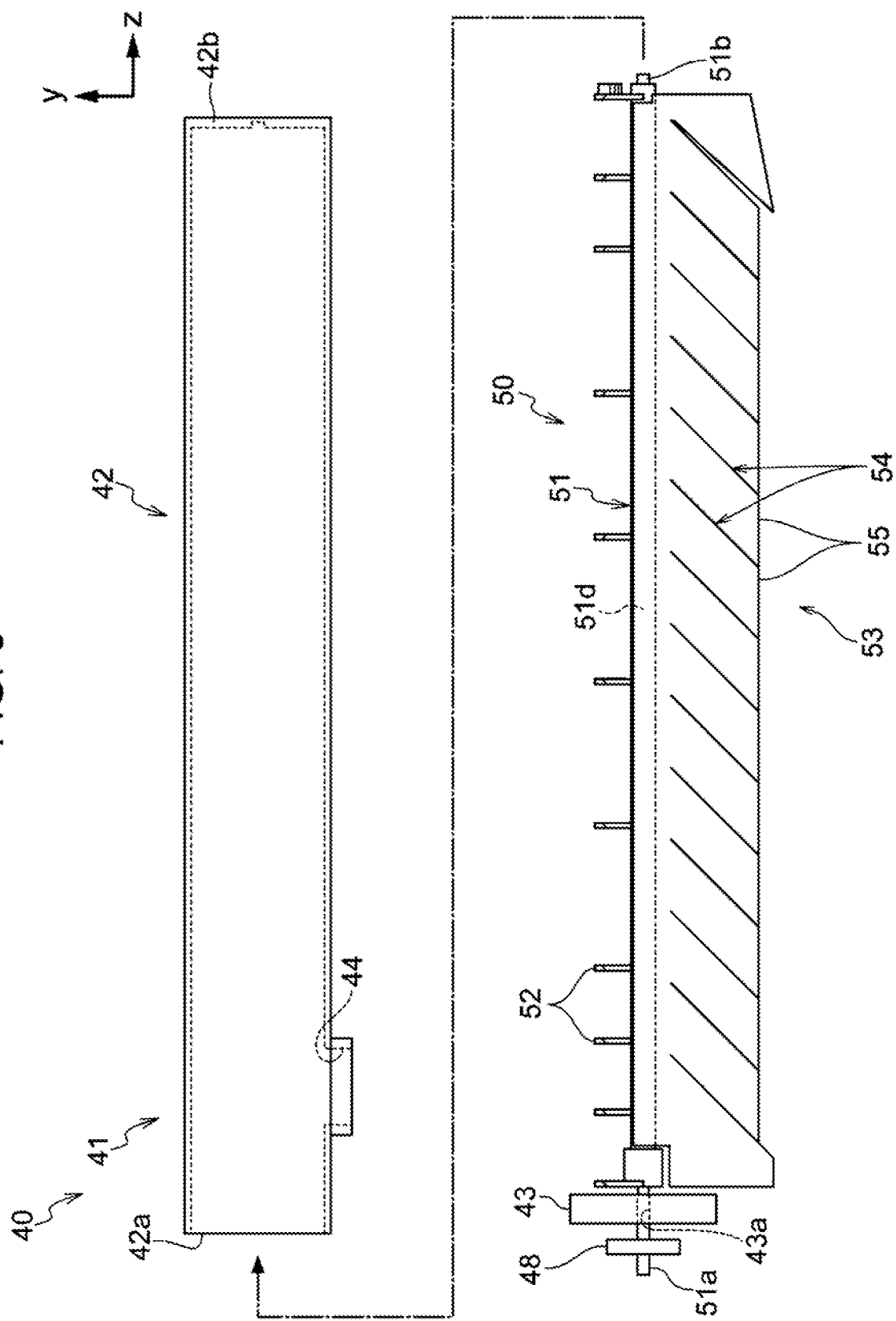

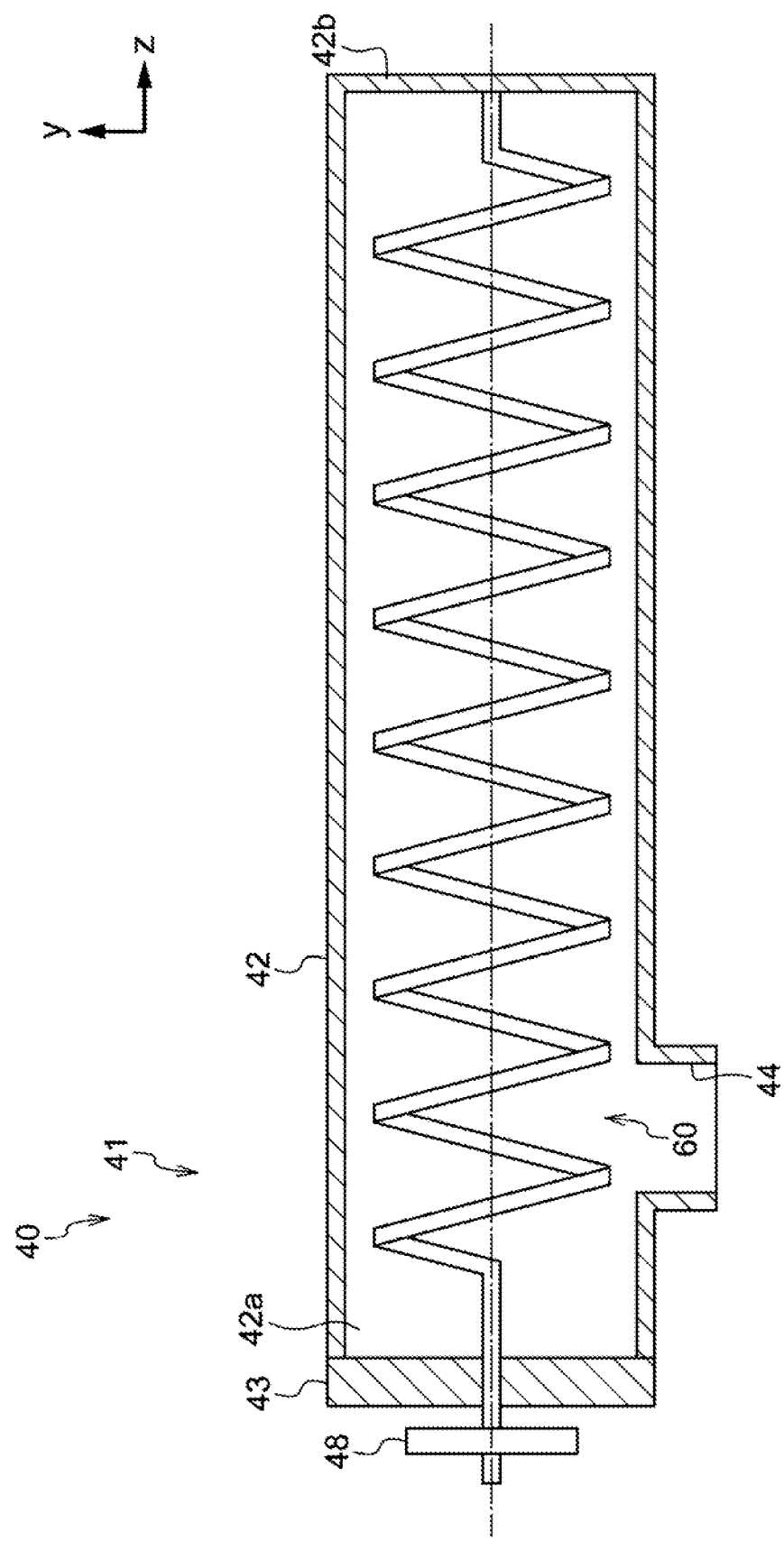

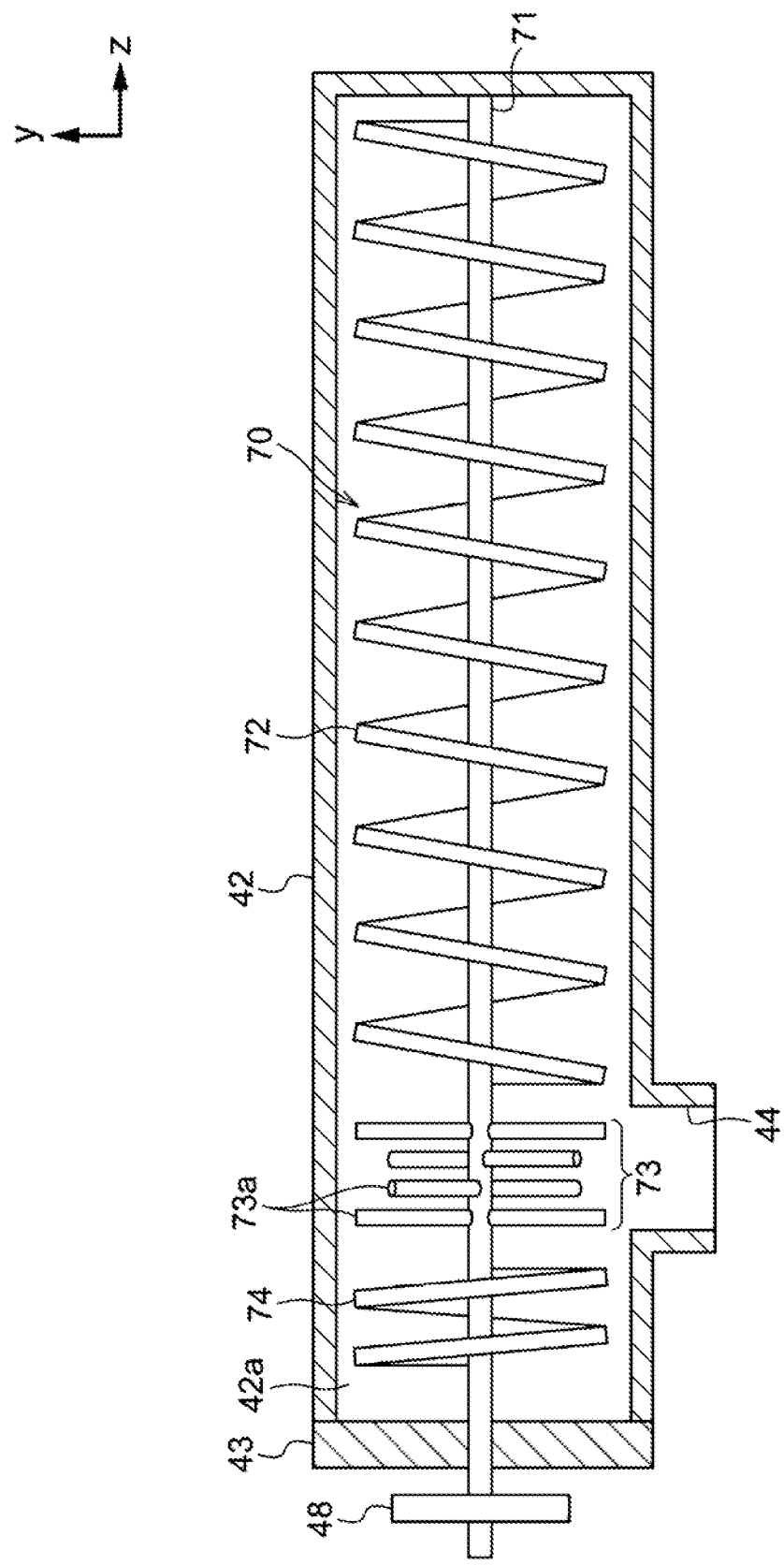

PARTICLE CONVEYING DEVICE AND IMAGE FORMING APPARATUS

CROSS-REFERENCE TO RELATED APPLICATIONS

This application is based on and claims priority under 35 USC 119 from Japanese Patent Application No. 2020-157928 filed Sep. 18, 2020.

BACKGROUND

(i) Technical Field

The present disclosure relates to a particle conveying device and an image forming apparatus.

(ii) Related Art

Japanese Unexamined Patent Application Publication No. 2018-002889 describes an adhesive material that satisfies formula 1: "20° C.≤T(1 Mpa)−T(10 Mpa)" (where T(1 Mpa) represents a temperature at which the viscosity is $10^4$ Pa·s at an applied pressure of 1 Mpa, and T(10 Mpa) represents a temperature at which the viscosity is $10^4$ Pa·s at an applied pressure of 10 MPa).

Japanese Unexamined Patent Application Publication No. 2018-004966 describes a pressure-bonded printed material forming apparatus that includes an attaching unit that attaches, onto an adherend surface, a powder that exhibits tackiness in response to pressure; a fixing unit that applies a pressure to a recording medium having the powder attached thereto so as to fix the powder as a tacky layer; a folding unit that folds the recording medium, which has the tacky layer on the adherend surface, so that the adherend surface is facing inward; and an applying unit that applies a pressure to the recording medium having the adherend surface facing inward so as to bond the opposing panes of the tacky layer of to each other, in which the powder satisfies the formula 1 described above.

Japanese Unexamined Patent Application Publication No. 2008-155412 describes a pressure-bonded printed material forming apparatus that can form a bi-fold pressure-bonded printed material ready for the post by electrophotographically transferring a powder adhesive to a sheet and performing pressure-bonding on a secret information print surface to which the powder adhesive has been applied, the apparatus including a first image forming unit that transfers secret information onto a back surface of a sheet by using a toner; a second image forming unit that transfers a powder adhesive to the secret information transfer surface; a first heating and pressing device that fixes the secret information onto the sheet and temporarily fixes the powder adhesive; a conveyor mechanism that flips and conveys the sheet; a third image forming unit that transfers variable information onto a surface of the sheet; a second heating and pressing device that fixes the variable information to the surface of the sheet; a first folding device that forms a valley fold at the middle of the back surface of the sheet; and a third heating and pressing device that fixes the temporarily fixed surface of the powder adhesive by using heat and pressure.

SUMMARY

Aspects of non-limiting embodiments of the present disclosure relate to suppressing aggregation of pressure sensitive adhesive particles conveyed in the storage portion compared to when the sulfur content of the pressure sensitive adhesive particles is less than 0.1 mass % or more than 0.5 mass %.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a particle conveying device including a storage portion that stores pressure sensitive adhesive particles that contain at least a binder resin, have a pressure-induced phase transition property, and have a sulfur content in a range of 0.1 mass % or more and 0.5 mass % or less relative to the entire pressure sensitive adhesive particles as measured by X-ray fluorescence; and a conveying member that is disposed in the storage portion and rotates about a shaft that extends in one direction inside the storage portion to thereby convey the pressure sensitive adhesive particles in a direction along the shaft inside the storage portion.

BRIEF DESCRIPTION OF THE DRAWINGS

Exemplary embodiments of the present disclosure will be described in detail based on the following figures, wherein:

FIG. 5 is a schematic view of one example of a cartridge according to an exemplary embodiment;

FIG. 6 is a schematic view of another example of a cartridge according to an exemplary embodiment; and FIG. 7 is a schematic view of yet another example of a cartridge according to an exemplary embodiment.

DETAILED DESCRIPTION

Figure 1:
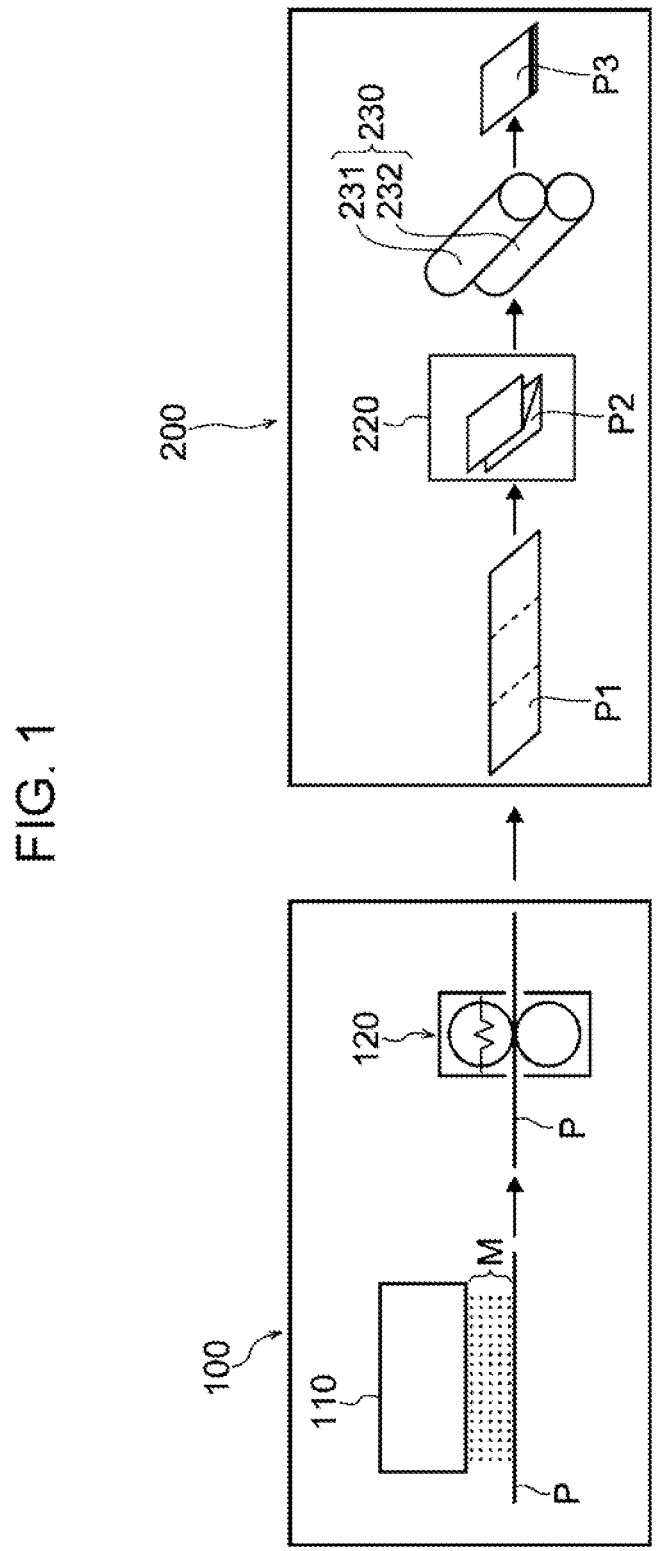
FIG. 1 is a schematic diagram of an example of an apparatus for producing a printed material according to an exemplary embodiment.

Exemplary embodiments of the present disclosure will now be described. The following descriptions and examples are merely exemplary and do not limit the scopes of the exemplary embodiments.

In the present disclosure, the numerical range that uses "to" indicates an inclusive range in which the values preceding and following the word "to" are included as the minimum value and the maximum value, respectively, of the range.

When numerical ranges are described stepwise in the present disclosure, the upper limit or the lower limit of one numerical range may be substituted with an upper limit or a lower limit of a different numerical range also described stepwise. In the numerical ranges described in the present disclosure, the upper limit or the lower limit of one numerical range may be substituted with a value indicated in Examples.

In the present disclosure, the term "step" not only refers to an independent step but also refers to any instance that achieves the desired purpose of that step although such a step is not clearly distinguished from other steps.

In the present disclosure, when a drawing is referred to describe an exemplary embodiment, the structure of that exemplary embodiment is not limited to the structure illustrated in the drawing. Moreover, the size of a member in each drawing is schematic, and the relative size relationship between the members is not limited to what is illustrated.

In the present disclosure, each component may contain more than one corresponding substances. In the present disclosure, when the amount of a component in a composition is referred and when there are two or more substances that correspond to that component in the composition, the amount is the total amount of the two or more substances in the composition unless otherwise noted.

In the present disclosure, particles corresponding to each component may contain more than one types of particles. When there are more than one types of particles corresponding to one component in the composition, the particle diameter of each component is a particle diameter of a mixture of the more than one types of particles present in the composition unless otherwise noted.

In the present disclosure, the notation "(meth)acryl" means "acryl" or "methacryl".

In the present disclosure, a printed material formed by folding a recording medium and bonding the opposing surfaces or a printed material formed by placing two or more recording media on top of each other and bonding the opposing surfaces is referred to as a "pressure-bonded printed material".

Pressure Sensitive Adhesive Particles

First Exemplary Embodiment

Pressure sensitive adhesive particles according to a first exemplary embodiment contain at least a binder resin, have a sulfur content in the range of 0.1% or more and 0.5% or less relative to the entire pressure sensitive adhesive particles as measured by X-ray fluorescence, and have a pressure-induced phase transition property.

The sulfur content is measured by quantitative analysis of the X-ray fluorescence intensity of the pressure sensitive adhesive particles. Specifically, for example, first, a sulfur-free resin and a sulfur supply source are mixed to obtain a resin mixture having a known sulfur concentration. This resin mixture (200 mg) is formed into a pellet sample by using a 13 mm-diameter pelletizer. The mass of the pellet sample is accurately weighed, and the X-ray fluorescence intensity of the pellet sample is measured to determine the peak intensity. In the same manner, pellet samples obtained by varying the amount of the sulfur supply source added are analyzed, and a calibration curve is plotted from these results. Then, the sulfur content in the pressure sensitive adhesive particles to be measured is quantitively analyzed by using this calibration curve.

In addition, the "pressure sensitive adhesive particles that have a pressure-induced phase transition property" means pressure sensitive adhesive particles that satisfy formula 1 below:

$$10° C. \leq T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining the temperature T1 and the temperature T2 is described below.

According to the pressure sensitive adhesive particles of the first exemplary embodiment, warping of the pressure-bonded printed material is suppressed due to the sulfur content in the aforementioned range compared to when the sulfur content is beyond or below the aforementioned range. Although the reason for this is not clear, the following is presumed.

The pressure sensitive adhesive particles that have the pressure-induced phase transition property are used, for example, in producing printed materials obtained through the pressure-bonding step. Specifically, for example, after the pressure sensitive adhesive particles are applied to a recording medium, this recording medium carrying the pressure sensitive adhesive particles is folded or another recording medium is stacked on the recording medium carrying the pressure sensitive adhesive particles, and pressure bonding is performed to obtain a printed material. When the printed material obtained as such is left standing, the printed material warps, possibly resulting in degradation of appearance and handling ease. In particular, when the printed material is left standing in a high humidity environment (for example, at a humidity of 85%), the printed material warps extensively. The reason for warping of the printed material left standing at high humidity is not clear, but it is presumed to be attributable to the difference in hygroscopicity between the recording medium constituting the printed material and the pressure sensitive adhesive particle layer that serves as a pressure-bonding layer.

The pressure sensitive adhesive particles of the first exemplary embodiment have a sulfur content within the aforementioned range. Presumably thus, the pressure sensitive adhesive particle layer in the pressure-bonded portion of the printed material becomes more hygroscopic than when the sulfur content is below the aforementioned range. Since not only the recording medium but also the pressure sensitive adhesive particle layer becomes highly hygroscopic, the difference between the expansion ratio of the recording medium attributable to moisture absorption and the expansion ratio of the pressure sensitive adhesive particle layer attributable to moisture absorption is decreased, and presumably thus warping of the printed material as a whole is suppressed. In addition, when the sulfur content is within the aforementioned range, the excessive relative increase in the expansion ratio of the pressure sensitive adhesive particle layer caused by excessive moisture absorption of the pressure sensitive adhesive particle layer rarely occurs compared to when the sulfur content is beyond the aforementioned range, and presumably thus, warping of the printed material as a whole is suppressed.

For the aforementioned reasons, it is presumed that, according to the pressure sensitive adhesive particles of the first exemplary embodiment, warping of the pressure-bonded printed material is suppressed compared to when the sulfur content is beyond or below the aforementioned range.

Pressure sensitive adhesive particles that have a sulfur content within the aforementioned range offer excellent releasability between the pressure sensitive adhesive particle layers of the pressure-bonded printed material compared to when the sulfur content is beyond the aforementioned range. In other words, when the sulfur content is within the aforementioned range, the release at the pressure sensitive adhesive particle layer, which is a pressure-bonded portion, easily occurs as the pressure-bonded printed matter is separated compared to when the sulfur content is beyond the aforementioned range.

The reason why the sulfur content within the aforementioned range improves releasability between the pressure sensitive adhesive particle layers is not clear, but it is presumed that, compared to when the sulfur content is beyond the aforementioned range, excessive moisture absorption of the pressure sensitive adhesive particle layers rarely occurs. When the pressure sensitive adhesive particle layer absorbs excessive humidity, the tackiness between the pressure sensitive adhesive particle layers is increased, and thus when the pressure-bonded printed material is to be separated, separation between the pressure sensitive adhesive particle layers is inhibited, and thus defects may occur in an image portion, a recording medium, or the like. In contrast, when the sulfur content is within the aforementioned range, excessive moisture absorption of the pressure sensitive adhesive particle layer is inhibited, and thus the releasability between the pressure sensitive adhesive particle layers is improved, and defects in the image portion, the recording medium, or the like are less likely to occur when separated.

The method for adjusting the sulfur content to the aforementioned range is not particularly limited, and, for example, a sulfur-containing compound may be added to the pressure sensitive adhesive base particles such that the content of that sulfur-containing compound gives a sulfur content within the aforementioned range. Examples of the method for adding a sulfur-containing compound to the pressure sensitive adhesive base particles include adding a sulfur-containing resin to a binder resin and adding a sulfur-containing additive to the pressure sensitive adhesive base particles. The sulfur-containing compound is described below.

Second Exemplary Embodiment

Pressure sensitive adhesive particles according to a second exemplary embodiment contain at least a binder resin, have a water absorption percentage of 0.2 mass % or more and 1.5 mass % or less, and have a pressure-induced phase transition property.

The water absorption percentage of the pressure sensitive adhesive particles refers to the rate of increase in the water content of the pressure sensitive adhesive particles in a high-temperature, high-humidity environment (specifically, a temperature of 28° C. and a humidity of 85%) relative to the water content of the pressure sensitive adhesive particles in a normal-temperature, normal-humidity environment (specifically, a temperature of 25° C. and a humidity of 50%).

The water absorption percentage is measured as follows. Specifically, 2 g of the pressure sensitive adhesive particles are put in an aluminum dish, left in an environment having a temperature of 25° C. and a humidity of 50% for 17 hours, weighed, then left in an environment having a temperature of 28° C. and a humidity of 85% for 17 hours, and weighed. When the mass of the pressure sensitive adhesive particles after being left at a temperature of 25° C. and a humidity of 50% is represented by Wa and the mass of the pressure sensitive adhesive particles after being left at a temperature of 28° C. and a humidity of 85% is represented by Wb, the water absorption percentage (%) is expressed by the following formula:

$$\text{water absorption percentage (\%)} = ((Wb - Wa)/Wa) \times 100 \quad \text{Formula:}$$

According to the pressure sensitive adhesive particles of the second exemplary embodiment, warping of the pressure-bonded printed material is suppressed due to the water absorption percentage in the aforementioned range compared to when the water absorption percentage is beyond or below the aforementioned range. Although the reason for this is not clear, the following is presumed.

As mentioned above, a printed material obtained by pressure-bonding by using pressure sensitive adhesive particles having a pressure-induced phase transition property may undergo warping particularly when left standing in a high temperature environment (for example, at a humidity of 85%).

Meanwhile, the pressure sensitive adhesive particles of the second exemplary embodiment have a water absorption percentage within the aforementioned range. Thus, compared to when the water absorption percentage is below the aforementioned range, the pressure sensitive adhesive particle layer in the pressure-bonded portion of the printed material becomes highly hygroscopic, the balance between the expansion ratio of the recording medium attributable to moisture absorption and the expansion ratio of the pressure sensitive adhesive particle layer attributable to moisture absorption is improved, and presumably thus warping of the printed material as a whole is suppressed. In addition, when the water absorption percentage of the pressure sensitive adhesive particles is within the aforementioned range, the excessive relative increase in the expansion ratio of the pressure sensitive adhesive particle layer caused by excessive moisture absorption of the pressure sensitive adhesive particle layer rarely occurs compared to when the water absorption percentage is beyond the aforementioned range, and presumably thus, warping of the printed material as a whole is suppressed.

For the aforementioned reasons, it is presumed that, according to the pressure sensitive adhesive particles of the second exemplary embodiment, warping of the pressure-bonded printed material is suppressed compared to when the water absorption percentage of the pressure sensitive adhesive particles is beyond or below the aforementioned range.

Pressure sensitive adhesive particles that have a water absorption percentage within the aforementioned range offer excellent releasability between the pressure sensitive adhesive particle layers of the pressure-bonded printed material and the defects in the image portion, recording medium, or the like are less likely to occur during separation compared to when the water absorption percentage is beyond the aforementioned range.

The method for adjusting the water absorption percentage of the pressure sensitive adhesive particles to the aforementioned range is not particularly limited, and, an example thereof is adjusting the sulfur content within the aforementioned range. An example of the method for adjusting the sulfur content to the aforementioned range involves adding a sulfur-containing compound to pressure sensitive adhesive base particles such that the content of that sulfur-containing compound gives a sulfur content within the aforementioned range. Examples of the method for adding a sulfur-containing compound to the pressure sensitive adhesive base particles include adding a sulfur-containing resin to a binder resin and adding a sulfur-containing additive to the pressure sensitive adhesive base particles. The sulfur-containing compound is described below.

Hereinafter, the pressure sensitive adhesive particles that correspond to those of the first exemplary embodiment or those of the second embodiment is referred to as the "pressure sensitive adhesive particles of the exemplary embodiment". However, an example of the pressure sensitive adhesive particles of the present disclosure may be pressure sensitive adhesive particles that correspond to at least one of the pressure sensitive adhesive particles of the first exemplary embodiment and the pressure sensitive adhesive particles of the second exemplary embodiment.

Pressure Sensitive Adhesive Particles Having Pressure-Induced Phase Transition Property The pressure sensitive adhesive particles of the exemplary embodiment have a pressure-induced phase transition property as described above.

The pressure sensitive adhesive particles that have a pressure-induced phase transition property may be any pressure sensitive adhesive particles that satisfy formula 1 above.

Specific examples of the pressure sensitive adhesive particles having a pressure-induced phase transition property include pressure sensitive adhesive particles that have at least two glass transition temperatures, and the difference between the lowest glass transition temperature and the highest glass transition temperature is 30° C. or more.

An example of the pressure sensitive adhesive particles in which the difference between the lowest glass transition temperature and the highest glass transition temperature is 30° C. or more is pressure sensitive adhesive particles in which the binder resin contains, as polymerization components, a styrene resin containing styrene and a vinyl monomer other than styrene as polymerization components, and a (meth)acrylate resin containing at least two (meth)acrylates as polymerization components, in which the mass ratio of the (meth)acrylates relative to a total of the polymerization components is 90 mass % or more.

In the description below, unless otherwise noted, a "styrene resin" refers to a "styrene resin that contains styrene and a vinyl monomer other than styrene as polymerization components", and a "(meth)acrylate resin" refers to a "(meth)acrylate resin that contains at least two (meth)acrylates as polymerization components, in which the mass ratio of the (meth)acrylates relative to the total of polymerization components is 90 mass % or more".

The pressure sensitive adhesive particles that contain a binder resin that contains a styrene resin and a (meth)acrylate resin more readily undergo pressure-induced phase transition and offer better adhesiveness than pressure sensitive adhesive particles that contain a homopolymer of a (meth)acrylate instead of the aforementioned (meth)acrylate resin. The mechanism behind this is presumably as follows.

In general, a styrene resin and a (meth)acrylate resin have low compatibility to each other, and thus it is considered that these resins in the pressure sensitive adhesive base particles are in a phase separated state. Moreover, it is considered that when pressure sensitive adhesive base particles are pressurized, the (meth)acrylate resin having a relatively low glass transition temperature is fluidized first, and this fluidization affects the styrene resin, resulting in fluidization of both resins. It is also considered that when the two resins in the pressure sensitive adhesive base particles solidify and form a resin layer as the pressure is decreased after the two resins have fluidized under pressure, a phase separated state is again formed due to their low compatibility.

t is assumed that a (meth)acrylate resin that contains at least two (meth)acrylates as polymerization components is easily fluidizable under pressure because there are at least two types of ester groups bonded to the main chain and thus the degree of molecular alignment in a solid state is low compared to a homopolymer of a (meth)acrylate. Moreover, it is assumed that when the mass ratio of the (meth)acrylates relative to the total of the polymerization components is 90 mass % or more, at least two types of ester groups are present at a high density; thus, the degree of molecular alignment in a solid state becomes lower, and thus the resin becomes easily fluidizable under pressure. Thus, it is assumed that the pressure sensitive adhesive particles described above more readily undergo pressure-induced fluidization, in other words, pressure-induced phase transition, compared to pressure sensitive adhesive particles in which the (meth)acrylate resin is a homopolymer of a (meth)acrylate.

In addition, it is assumed that a (meth)acrylate resin containing at least two (meth)acrylates as polymerization components, in which the mass ratio of the (meth)acrylates relative to the total of polymerization components is 90 mass % or more, has a low degree of molecular alignment during re-solidification, and, thus, a microphase separation occurs with a styrene resin. The finer the state of phase separation between the styrene resin and the (meth)acrylate resin, the higher the uniformity of the state of the bonding surface to an adherend, and the more excellent the adhesiveness. Thus, it is assumed that the pressure sensitive adhesive particles of this exemplary embodiment have excellent adhesiveness compared to pressure sensitive adhesive particles in which the (meth)acrylate resin is a homopolymer of a (meth)acrylate.

In the description below, the components, the structure, and the properties of pressure sensitive adhesive particles that contain a binder resin that contains the aforementioned styrene resin and the aforementioned (meth)acrylate resin are described in detail as one example of the pressure sensitive adhesive particles of the exemplary embodiment.

The pressure sensitive adhesive particles of the exemplary embodiment contain at least pressure sensitive adhesive base particles and, if needed, an external additive.

Pressure Sensitive Adhesive Base Particles

The pressure sensitive adhesive base particles contain at least a binder resin. The binder resin contains, for example, a styrene resin and a (meth)acrylate resin.

The pressure sensitive adhesive base particles may further contain a coloring agent, a releasing agent, and other additives.

From the viewpoint of maintaining adhesiveness, the styrene resin content in the binder resin may be larger than the (meth)acrylate resin content. The styrene resin content relative to the total content of the styrene resin and the (meth)acrylate resin is preferably 55 mass % or more and 80 mass % or less, is more preferably 60 mass % or more and 75 mass % or less, and is yet more preferably 65 mass % or more and 70 mass % or less.

Styrene Resin

The pressure sensitive adhesive base particles contain, for example, a styrene resin that contains styrene and a vinyl monomer other than styrene as polymerization components.

From the viewpoint of suppressing fluidization of the pressure sensitive adhesive particles in an unpressured state, the mass ratio of styrene relative to the total of the polymerization components of the styrene resin is preferably 60 mass % or more, more preferably 70 mass % or more, and yet more preferably 75 mass % or more. From the viewpoint of forming pressure sensitive adhesive particles that easily undergo pressure-induced phase transition, the mass ratio is preferably 95 mass % or less, more preferably 90 mass % or less, and yet more preferably 85 mass % or less.

Examples of the vinyl monomer other than styrene constituting the styrene resin include styrene monomers other than styrene and acryl monomers.

Examples of the styrene monomers other than styrene include vinyl naphthalene; alkyl-substituted styrenes such as α-methylstyrene, o-methylstyrene, m-methylstyrene, p-methylstyrene, p-ethylstyrene, 2,4-dimethylstyrene, p-n- butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene. These styrene monomers may be used alone or in combination.

The acryl monomer may be at least one acryl monomer selected from the group consisting of (meth)acrylic acid and (meth)acrylates. Examples of the (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates. These acryl monomers may be used alone or in combination.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth) acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxyethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

Examples of other vinyl monomer constituting the styrene resin include, in addition to the styrene monomers and acryl monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming pressure sensitive adhesive particles that easily undergo pressure-induced phase transition, the styrene resin preferably contains, as a polymerization component, a (meth)acrylate, more preferably an alkyl (meth)acrylate, yet more preferably an alkyl (meth) acrylate in which the alkyl group contains 2 to 10 carbon atoms, still more preferably an alkyl (meth)acrylate in which the alkyl group contains 4 to 8 carbon atoms, and particularly preferably at least one of n-butyl acrylate and 2-ethylhexyl acrylate. From the viewpoint of forming pressure sensitive adhesive particles that easily undergo pressure-induced phase transition, the styrene resin and the (meth) acrylate resin may contain the same (meth)acrylate as a polymerization component.

From the viewpoint of suppressing fluidization of the pressure sensitive adhesive particles in an unpressured state, the mass ratio of the (meth)acrylate relative to the total of the polymerization components of the styrene resin is preferably 40 mass % or less, more preferably 30 mass % or less, and yet more preferably 25 mass % or less. From the viewpoint of forming pressure sensitive adhesive particles that easily undergo pressure-induced phase transition, the mass ratio is preferably 5 mass % or more, more preferably 10 mass % or more, and yet more preferably 15 mass % or more. The (meth)acrylate here is preferably an alkyl (meth)acrylate, yet more preferably an alkyl (meth)acrylate in which the alkyl group contains 2 to 10 carbon atoms, and still more preferably an alkyl (meth)acrylate in which the alkyl group contains 4 to 8 carbon atoms.

The styrene resin particularly preferably contains, as a polymerization component, at least one of n-butyl acrylate and 2-ethylhexyl acrylate, and the total amount of n-butyl acrylate and 2-ethylhexyl acrylate relative to the total of polymerization components of the styrene resin is preferably 40 mass % or less, more preferably 30 mass % or less, and yet more preferably 25 mass % or less from the viewpoint of suppressing fluidization of the pressure sensitive adhesive particles in an unpressured state. From the viewpoint of forming pressure sensitive adhesive particles that easily undergo pressure-induced phase transition, the total amount is preferably 5 mass % or more, more preferably 10 mass % or more, and yet more preferably 15 mass % or more.

From the viewpoint of suppressing fluidization of the pressure sensitive adhesive particles in an unpressured state, the weight-average molecular weight of the styrene resin is preferably 3000 or more, more preferably 4000 or more, and yet more preferably 5000 or more. From the viewpoint of forming pressure sensitive adhesive particles that easily undergo pressure-induced phase transition, the weight-average molecular weight is preferably 50000 or less, more preferably 45000 or less, and yet more preferably 40000 or less.

In the present disclosure, the weight-average molecular weight of a resin is measured by gel permeation chromatography (GPC). The molecular weight measurement by GPC is conducted by using HLC-8120GPC produced by TOSOH CORPORATION as a GPC instrument with columns, TSKgel Super HM-M (15 cm) produced by TOSOH CORPORATION, and tetrahydrofuran as a solvent. The weight-average molecular weight of a resin is calculated by using a molecular weight calibration curve prepared by using monodisperse polystyrene standard samples.

From the viewpoint of suppressing fluidization of the pressure sensitive adhesive particles in an unpressured state, the glass transition temperature of the styrene resin is preferably 30° C. or more, more preferably 40° C. or more, and yet more preferably 50° C. or more. From the viewpoint of forming pressure sensitive adhesive particles that easily undergo pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin is controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the pressure sensitive adhesive particles in an unpressured state, the mass ratio of the styrene resin relative to the entire pressure sensitive adhesive base particles in this exemplary embodiment is preferably 55 mass % or more, more preferably 60 mass % or more, and yet more preferably 65 mass % or more. From the viewpoint of forming pressure sensitive adhesive particles that easily undergo pressure-induced phase transition, the mass ratio is preferably 80 mass % or less, more preferably 75 mass % or less, and yet more preferably 70 mass % or less.

(Meth)Acrylate Resin

The pressure sensitive adhesive base particles described above contain, for example, a (meth)acrylate resin that contains at least two (meth)acrylates as polymerization components, and the mass ratio of the (meth)acrylates relative to the total of polymerization components is 90 mass % or more.

The mass ratio of the (meth)acrylates relative to the total of the polymerization components of the (meth)acrylate resin is, for example, 90 mass % or more, preferably 95 mass % or more, more preferably 98 mass % or more, and yet more preferably 100 mass %.

Examples of the (meth)acrylates include alkyl (meth)acrylates, carboxy-substituted alkyl (meth)acrylates, hydroxy-substituted alkyl (meth)acrylates, alkoxy-substituted alkyl (meth)acrylates, and di(meth)acrylates.

Examples of the alkyl (meth)acrylates include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the carboxy-substituted alkyl (meth)acrylates is 2-carboxylethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylates also include 2-(diethylamino)ethyl (meth)acrylate, benzyl (meth)acrylate, and methoxypolyethylene glycol (meth)acrylate.

These (meth)acrylates may be used alone or in combination.

From the viewpoint of forming pressure sensitive adhesive particles that easily undergo pressure-induced phase transition and have excellent adhesiveness, the (meth)acrylates are preferably alkyl (meth)acrylates, yet more preferably alkyl (meth)acrylates in which the alkyl group contains 2 to 10 carbon atoms, still more preferably alkyl (meth)acrylates in which the alkyl group contains 4 to 8 carbon atoms, and particularly preferably n-butyl acrylate and 2-ethylhexyl acrylate. From the viewpoint of forming pressure sensitive adhesive particles that easily undergo pressure-induced phase transition, the styrene resin and the (meth)acrylate resin may contain the same (meth)acrylate as a polymerization component.

From the viewpoint of forming pressure sensitive adhesive particles that easily undergo pressure-induced phase transition and have excellent adhesiveness, the mass ratio of the alkyl (meth)acrylates relative to the total of the polymerization components of the (meth)acrylate resin is preferably 90 mass % or more, more preferably 95 mass % or more, yet more preferably 98 mass % or more, and still more preferably 100 mass %. The alkyl (meth)acrylates here preferably each have an alkyl group having 2 to 10 carbon atoms and more preferably each have an alkyl group containing 4 to 8 carbon atoms.

From the viewpoint of forming pressure sensitive adhesive particles that easily undergo pressure-induced phase transition and have excellent adhesiveness, the mass ratio between two (meth)acrylates having the largest and second-largest mass ratios among the at least two (meth)acrylates contained as the polymerization components in the (meth)acrylate resin is preferably 80:20 to 20:80, more preferably 70:30 to 30:70, and yet more preferably 60:40 to 40:60.

The two (meth)acrylates having the largest and second-largest mass ratios among the at least two (meth)acrylates contained as the polymerization components in the (meth)acrylate resin are preferably alkyl (meth)acrylates. The alkyl (meth)acrylates here preferably each have an alkyl group having 2 to 10 carbon atoms and more preferably each have an alkyl group containing 4 to 8 carbon atoms.

When the two (meth)acrylates having the largest and second-largest mass ratios among the at least two (meth)acrylates contained as polymerization components in the (meth)acrylate resin are alkyl (meth)acrylates, from the viewpoint of forming pressure sensitive adhesive particles that easily undergo pressure-induced phase transition and have excellent adhesiveness, the difference in the number of carbon atoms in the alkyl group between the two alkyl (meth)acrylates is preferably 1 to 4, more preferably 2 to 4, and yet more preferably 3 or 4.

From the viewpoint of forming pressure sensitive adhesive particles that easily undergo pressure-induced phase transition and have excellent adhesiveness, the (meth)acrylate resin preferably contains, as polymerization components, n-butyl acrylate and 2-ethylhexyl acrylate. In particular, the two (meth)acrylates having the largest and second-largest mass ratios among the at least two (meth)acrylates contained as polymerization components in the (meth)acrylate resin are preferably n-butyl acrylate and 2-ethylhexyl acrylate. The total amount of n-butyl acrylate and 2-ethylhexyl acrylate relative to the total of polymerization components of the (meth)acrylate resin is preferably 90 mass % or more, more preferably 95 mass % or more, yet more preferably 98 mass % or more, and still more preferably 100 mass %.

The (meth)acrylate resin may further contain, as polymerization components, vinyl monomers other than (meth)acrylates. Examples of the vinyl monomers other than the (meth)acrylates include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. These vinyl monomers may be used alone or in combination.

When the (meth)acrylate resin contains a vinyl monomer other than (meth)acrylates as polymerization components, the vinyl monomer other than the (meth)acrylates is preferably at least one of acrylic acid and methacrylic acid and is more preferably acrylic acid.

From the viewpoint of suppressing fluidization of the pressure sensitive adhesive particles in an unpressured state, the weight-average molecular weight of the (meth)acrylate resin is preferably 50,000 or more, more preferably 100,000 or more, and yet more preferably 120,000 or more. From the viewpoint of forming pressure sensitive adhesive particles that easily undergo pressure-induced phase transition, the weight-average molecular weight is preferably 250,000 or less, more preferably 220,000 or less, and yet more preferably 200,000 or less.

From the viewpoint of forming pressure sensitive adhesive particles that easily undergo pressure-induced phase transition, the glass transition temperature of the (meth)acrylate resin is preferably 10° C. or less, more preferably 0° C. or less, and yet more preferably −10° C. or less. From the viewpoint of suppressing fluidization of the pressure sensitive adhesive particles in an unpressured state, the glass transition temperature is preferably −90° C. or more, more preferably −80° C. or more, and yet more preferably −70° C. or more.

From the viewpoint of forming pressure sensitive adhesive particles that easily undergo pressure-induced phase transition, the mass ratio of the (meth)acrylate resin relative to the entire pressure sensitive adhesive base particles is preferably 20 mass % or more, more preferably 25 mass % or more, and yet more preferably 30 mass % or more. From the viewpoint of suppressing fluidization of the pressure sensitive adhesive particles in an unpressured state, the mass ratio is preferably 45 mass % or less, more preferably 40 mass % or less, and yet more preferably 35 mass % or less.

The total amount of the styrene resin and the (meth)acrylate resin contained in the pressure sensitive adhesive base particles relative to the entire pressure sensitive adhesive base particles is preferably 70 mass % or more, more preferably 80 mass % or more, yet more preferably 90 mass % or more, still preferably 95 mass % or more, and most preferably 100 mass %.

Other Resins

The pressure sensitive adhesive base particles may contain, for example, a non-vinyl resin, such as a polystyrene-epoxy resin, a polyester resin, a polyurethane resin, a polyamide resin, a cellulose resin, a polyether resin, or modified rosin. These resins may be used alone or in combination.

As described above, for the purpose of adjusting the sulfur content to the aforementioned range, a sulfur-containing resin may be added to the binder resin. The sulfur-containing resin may be contained as the styrene resin in the binder resin, as the (meth)acrylate resin in the binder resin, or as another resin in the binder resin.

Examples of the sulfur-containing resin include thiol group-containing resins, specifically, styrene resins and acrylic resins that use, as one of the monomer components, octanethiol, nonanethiol, decanethiol, undecanethiol, dodecanethiol, tridecanethiol, tetradecanethiol, pentadecanethiol, hexadecanethiol, or the like.

Various Additives

The pressure sensitive adhesive base particles may contain, if needed, a coloring agent (for example, a pigment or a dye), a releasing agent (for example, hydrocarbon wax, natural wax such as carnauba wax, rice wax, or candelilla wax, a synthetic or mineral or petroleum wax such as montan wax; or ester wax such as fatty acid ester or montanic acid ester), a charge controlling agent, and the like.

When the pressure sensitive adhesive particles of this exemplary embodiment are transparent, the amount of the coloring agent in the pressure sensitive adhesive base particles relative to the entire pressure sensitive adhesive base particles may be zero or 1.0 mass % or less, and, from the viewpoint of increasing the transparency of the pressure sensitive adhesive particles, is as small as possible.

As described above, for the purpose of adjusting the sulfur content to the aforementioned range, a sulfur-containing additive may be added to the pressure sensitive adhesive base particles.

Examples of the sulfur-containing additive include thiol group-containing compounds, specifically, octanethiol, nonanethiol, decanethiol, undecanethiol, dodecanethiol, tridecanethiol, tetradecanethiol, pentadecanethiol, and hexadecanethiol.

Structure of Pressure Sensitive Adhesive Base Particles

The inner structure of the pressure sensitive adhesive base particles may be a sea-island structure. The sea-island structure may be constituted by a sea phase containing a styrene resin and island-phases containing a (meth)acrylate resin and being dispersed in the sea phase. Specific examples of the styrene resin contained in the sea phase are as described above. Specific examples of the (meth)acrylate resin contained in the island phases are as described above. Alternatively, island phases not containing a (meth)acrylate resin may be dispersed in the sea phase.

When the pressure sensitive adhesive base particles have a sea-island structure, the average size of the island phases may be 200 nm or more and 500 nm or less. When the average size of the island phases is 500 nm or less, the pressure sensitive adhesive base particles easily undergo pressure-induced phase transition. When the average size of the island phases is 200 nm or more, excellent mechanical strength desired for the pressure sensitive adhesive base particles (for example, the strength that withstands deformation during stirring in a developing device) is exhibited. From these viewpoints, the average size of the island phases is more preferably 220 nm or more and 450 nm or less and yet more preferably 250 nm or more and 400 nm or less.

Examples of the method for controlling the average size of the island phases of the sea-island structure to be within the aforementioned range include increasing or decreasing the amount of the (meth)acrylate resin relative to the amount of the styrene resin and increasing or decreasing the length of time of maintaining a high temperature in the step of fusing and coalescing aggregated particles in the method for producing pressure sensitive adhesive base particles described below.

The sea-island structure is confirmed and the average size of the island phases is measured as follows.

The pressure sensitive adhesive particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). The sea phase and the island phases of the sea-island structure are distinguished by the shade created by the degree of staining with osmium tetroxide or ruthenium tetroxide, and the presence or absence of the sea-island structure is identified by the shade. From an SEM image, one hundred island phases are selected at random, a long axis of each island phase is measured, and the average of one hundred long axes is used as the average size.

The pressure sensitive adhesive base particles may have a single layer structure or may have a core-shell structure including a core and a shell layer that covers the core. From the viewpoint of suppressing fluidization of the pressure sensitive adhesive particles in an unpressured state, the pressure sensitive adhesive base particles may have a core-shell structure.

From the viewpoint of facilitating the pressure-induced phase transition, when the pressure sensitive adhesive base particles have a core-shell structure, the core may contain a styrene resin and a (meth)acrylate resin. From the viewpoint of suppressing fluidization of the pressure sensitive adhesive particles in an unpressured state, the shell layer may contain a styrene resin. The specific examples of the styrene resin are as described above. The specific examples of the (meth) acrylate resin are as described above.

When the pressure sensitive adhesive base particles have a core-shell structure, for the purpose of adjusting the sulfur content to be within the aforementioned range, a sulfur-containing compound (for example, a sulfur-containing resin or a sulfur-containing additive) may be added to the core, the shell layer, or both the core and the shell layer. The sulfur-containing compound is preferably contained in at least the shell layer and is more preferably contained in both the core and the shell layer.

When the pressure sensitive adhesive base particles have a core-shell structure, the core may have a sea phase containing a styrene resin and island phases containing a (meth)acrylate resin and being dispersed in the sea phase. The average size of the island phases may be within the aforementioned range. In addition to the core having the above-described structure, the shell layer may contain a styrene resin. In such a case, the sea phase of the core and the shell layer form a continuous structure, and the pressure sensitive adhesive base particles easily undergo pressure-induced phase transition. The specific examples of the styrene resin contained in the sea phase of the core and the shell layer are as described above. The specific examples of the (meth)acrylate resin contained in the island phases of the core are as described above.

Examples of the resin contained in the shell layer also include a non-vinyl resins, such as a polystyrene-epoxy resin, a polyester resin, a polyurethane resin, a polyamide resin, a cellulose resin, a polyether resin, and modified rosin. These resins may be used alone or in combination.

From the viewpoint of suppressing deformation of the pressure sensitive adhesive base particles, the average thickness of the shell layer is preferably 120 nm or more, more preferably 130 nm or more, and yet more preferably 140 nm or more. From the viewpoint of facilitating the pressure-induced phase transition of the pressure sensitive adhesive base particles, the average thickness is preferably 550 nm or less, more preferably 500 nm or less, and yet more preferably 400 nm or less.

The average thickness of the shell layer is measured by the following method.

The pressure sensitive adhesive particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, sections of ten pressure sensitive adhesive base particles are selected at random, the thickness of the shell layer is measured at twenty positions for each of the pressure sensitive adhesive base particles, and the average thickness is calculated. The average value of ten pressure sensitive adhesive base particles is used as the average thickness.

From the viewpoint of handling ease of the pressure sensitive adhesive base particles, the volume-average particle diameter (D50v) of the pressure sensitive adhesive base particles is preferably 4 μm or more, more preferably 5 μm or more, and yet more preferably 6 μm or more, and from the viewpoint of facilitating the pressure-induced phase transition of the entire pressure sensitive adhesive base particles, the volume-average particle diameter (D50v) is preferably 12 μm or less, more preferably 10 μm or less, and yet more preferably 9 μm or less.

The volume-average particle diameter (D50v) of the pressure sensitive adhesive base particles is determined by using Coulter MULTISIZER II (produced by Beckman Coulter Inc.) with apertures having an aperture diameter of 100 μm. Into 2 mL of a 5 mass % aqueous sodium alkyl benzenesulfonate solution, 0.5 mg or more and 50 mg or less of the pressure sensitive adhesive base particles is added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume-average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine high-molecular-weight materials).

The externally added amount of the external additive relative to the pressure sensitive adhesive base particles is preferably 0.01 mass % or more and 5 mass % or less and is more preferably 0.01 mass % or more and 3.0 mass % or less.

Properties of Pressure Sensitive Adhesive Particles

Sulfur Content and Water Absorption Percentage of Pressure Sensitive Adhesive Particles The sulfur content in the pressure sensitive adhesive particles of this exemplary embodiment is preferably 0.1 mass % or more and 0.5 mass % or less, and, from the viewpoint of suppressing warping after pressure-bonding, is more preferably 0.15 mass % or more and 0.4 mass % or less and yet more preferably 0.2 mass % or more and 0.3 mass % or less.

The water absorption percentage of the pressure sensitive adhesive particles of this exemplary embodiment is preferably 0.2 mass % or more and 1.5 mass % or less, and, from the viewpoint of suppressing warping after pressure-bonding, is more preferably 0.3 mass % or more and 1.2 mass % or less and yet more preferably 0.4 mass % or more and 0.8 mass % or less.

Pressure-Induced Phase Transition Property

The pressure sensitive adhesive particles of the exemplary embodiment undergo pressure-induced phase transition, and satisfy formula 1 below:

$$10° C. \leq T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa.

From the viewpoint of facilitating the pressure-induced phase transition of the pressure sensitive adhesive particles, the temperature difference T1−T2 is preferably 10° C. or more, more preferably 15° C. or more, and yet more preferably 20° C. or more. From the viewpoint of suppressing fluidization of the pressure sensitive adhesive particles in an unpressured state, the temperature difference (T1−T2) is preferably 120° C. or less, more preferably 100° C. or less, and yet more preferably 80° C. or less.

The value of the temperature T1 is preferably 140° C. or less, more preferably 130° C. or less, yet more preferably 120° C. or less, and particularly preferably 115° C. or less. The lower limit of the temperature T1 is preferably 80° C. or more and more preferably 85° C. or more.

The value of the temperature T2 is preferably 40° C. or more, more preferably 50° C. or more, and yet more preferably 60° C. or more. The upper limit of the temperature T2 may be 85° C. or less.

One indicator of how easily the pressure sensitive adhesive particles undergo pressure-induced phase transition is the temperature difference (T1−T3) between the temperature T1 at which the viscosity is 10000 Pa·s at a pressure of 1 MPa and the temperature T3 at which the viscosity is 10000 Pa·s at a pressure of 4 MPa. The temperature difference (T1−T3) may be 5° C. or more. From the viewpoint of facilitating the pressure-induced phase transition, the temperature difference (T1−T3) of the pressure sensitive adhesive particles is preferably 5° C. or more and more preferably 10° C. or more.

The temperature difference (T1−T3) is typically 25° C. or less.

From the viewpoint of adjusting the temperature difference (T1−T3) to 5° C. or more, the temperature T3 at which the viscosity is 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Pressure sensitive adhesive particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined as with the method for determining the temperature T1 except that the applied pressure is changed from 1 MPa to 10 MPa. The temperature T3 is determined as with the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Glass Transition Temperature

As described above, an example of the pressure sensitive adhesive particles having a pressure-induced phase transition property is pressure sensitive adhesive particles that have at least two glass transition temperatures, and the difference between the lowest glass transition temperature and the highest glass transition temperature is 30° C. or more. When the pressure sensitive adhesive particles having at least two glass transition temperatures contain a styrene resin and a (meth)acrylate resin, one of the glass transition temperatures is presumed to be that of the styrene resin and the other one of which is presumed to be that of the (meth)acrylate resin.

The pressure sensitive adhesive particle of the exemplary embodiment may have three or more glass transition temperatures; however, the number of glass transition temperatures is preferably two. Examples of the case in which there are two glass transition temperatures include the case in which a styrene resin and a (meth)acrylate resin are the only resins contained in the pressure sensitive adhesive particles, and the case in which the amount of resins other than the styrene resin and the (meth)acrylate resin is small (for example, the amount of other resins is 5 mass % or less relative to the entire pressure sensitive adhesive particles).

When the pressure sensitive adhesive particles have at least two glass transition temperatures and the difference between the lowest glass transition temperature and the highest glass transition temperature is 30° C. or more, from the viewpoint of further facilitating the pressure sensitive adhesive particles to undergo pressure-induced phase transition, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of facilitating the pressure-induced phase transition of the pressure sensitive adhesive particles, the lowest glass transition temperature of the pressure sensitive adhesive particles is preferably 10° C. or less, more preferably 0° C. or less, and yet more preferably −10° C. or less. From the viewpoint of suppressing fluidization of the pressure sensitive adhesive particles in an unpressured state, the lowest glass transition temperature is preferably −90° C. or more, more preferably −80° C. or more, and yet more preferably −70° C. or more.

From the viewpoint of suppressing fluidization of the pressure sensitive adhesive particles in an unpressured state, the highest glass transition temperature of the pressure sensitive adhesive particles is preferably 30° C. or more, more preferably 40° C. or more, and yet more preferably 50° C. or more. From the viewpoint of facilitating the pressure-induced phase transition of the pressure sensitive adhesive particles, the highest glass transition temperature is preferably 70° C. or less, more preferably 65° C. or less, and yet more preferably 60° C. or less.

In the present disclosure, the glass transition temperature of the pressure sensitive adhesive particles is determined by preparing a plate-shaped sample by compressing the pressure sensitive adhesive particles and then performing differential scanning calorimetry (DSC) on the sample to obtain a differential scanning calorimetry curve (DSC curve), and determining the glass transition temperature from the DSC curve. More specifically, the glass transition temperature is determined from the "extrapolated glass transition onset temperature" described in the method for determining the glass transition temperature in JIS K 7121: 1987 "Testing Methods for Transition Temperatures of Plastics".

Method for Producing Pressure Sensitive Adhesive Particles

The pressure sensitive adhesive particles of the exemplary embodiment are obtained by first producing pressure sensitive adhesive base particles and then externally adding an external additive to the pressure sensitive adhesive base particles.

The pressure sensitive adhesive base particles may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce the pressure sensitive adhesive base particles.

When the pressure sensitive adhesive base particles are to be produced by the aggregation and coalescence method, the pressure sensitive adhesive base particles are produced through, for example, the following steps:

a step of preparing a styrene resin particle dispersion in which styrene resin particles containing a styrene resin are dispersed (styrene resin particle dispersion preparation step);

a step of polymerizing a (meth)acrylate resin in the styrene resin particle dispersion so as to form composite resin particles containing the styrene resin and the (meth) acrylate resin (composite resin particle forming step);

a step aggregating the composite resin particles in the composite resin particle dispersion in which the composite resin particles are dispersed so as to form aggregated particles (aggregated particle forming step); and a step of heating the aggregated particle dispersion in which the aggregated particles are dispersed so as to fuse and coalesce the aggregated particles and thereby form pressure sensitive adhesive base particles (fusing and coalescing step).

These steps will now be described in detail.

In the description below, a method for obtaining pressure sensitive adhesive base particles not containing a coloring agent or a releasing agent is described. A coloring agent, a releasing agent, and other additives may be used as needed. When the pressure sensitive adhesive base particles are to contain a coloring agent and a releasing agent, the fusing and coalescing step is performed after the composite resin particle dispersion, a coloring agent particle dispersion, and a releasing agent particle dispersion are mixed. The coloring agent particle dispersion and the releasing agent particle dispersion are, for example, prepared by mixing raw materials and then dispersing the particles in a known disperser.

Styrene Resin Particle Dispersion Preparation Step

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a styrene resin, and a chain transfer agent or a polymerization initiator are mixed, an aqueous medium containing a surfactant is added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-basis particle size distribution calculated from the small diameter side.

The styrene resin particle content in the styrene resin particle dispersion is preferably 30 mass % or more and 60 mass % or less and is more preferably 40 mass % or more and 50 mass % or less.

Composite Resin Particle Forming Step

The styrene resin particle dispersion and the polymerization components of a (meth)acrylate resin are mixed, and the (meth)acrylate resin is polymerized in the styrene resin particle dispersion so as to form composite resin particles containing the styrene resin and the (meth)acrylate resin.

The composite resin particles may be resin particles containing a styrene resin and a (meth)acrylate resin that are in a microphase-separated state. Such resin particles are produced by, for example, the following method.

To a styrene resin particle dispersion, polymerization components (a group of monomers including at least two (meth)acrylates) of the (meth)acrylate resin are added, and, if needed, an aqueous medium is added thereto. Next, while slowly stirring the dispersion, the temperature of the dispersion is elevated to a temperature higher than or equal to the glass transition temperature of the styrene resin (for example, a temperature 10° C. to 30° C. higher than the glass transition temperature of the styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the (meth) acrylates become polymerized inside the styrene resin particles. It is presumed that because of this mechanism, composite resin particles in which the (meth)acrylate resin is contained inside the styrene resin particles and in which the styrene resin and the (meth)acrylate resin are in a microphase-separated state inside the particles are obtained.

The volume-average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less.

Aggregated Particle Forming Step

The composite resin particles are aggregated in the composite resin particle dispersion so as to form aggregated particles having diameters close to the target diameter of the pressure sensitive adhesive base particles.

Specifically, for example, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the styrene resin (specifically, for example, a temperature 10° C. to 30° C. lower than the glass transition temperature of the styrene resin) so as to aggregate the composite resin particles and form aggregated particles.

In the aggregated particle forming step, while the composite resin particle dispersion is being stirred in a rotational shear-type homogenizer, an aggregating agent may be added thereto at room temperature (for example, 25° C.) and the pH of the composite resin particle dispersion may be adjusted to acidic (for example, a pH of 2 or more and 5 or less), and then heating may be performed after the dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

Next, the aggregated particle dispersion containing dispersed aggregated particles is heated to, for example, a temperature equal to or higher than the glass transition temperature of the styrene resin (for example, a temperature 10° C. to 30° C. higher than the glass transition temperature of the styrene resin) to fuse and coalesce the aggregated particles and form pressure sensitive adhesive base particles.

The pressure sensitive adhesive base particles obtained through the above-described steps usually have a sea-island structure that has a sea phase containing a styrene resin and island phases containing the (meth)acrylate resin and being dispersed in the sea phase. It is presumed that although the styrene resin and the (meth)acrylate resin are in a microphase-separated state in the composite resin particles, the styrene resin has gathered in the fusing and coalescence step to form a sea phase, and the (meth)acrylate resin has gathered to form island phases.

The average size of the island phases of the sea-island structure is controlled by, for example, increasing or decreasing the amount of the styrene resin particle dispersion or the amount of the at least two (meth)acrylates used in the composite resin particle forming step, or by increasing or decreasing the length of time of maintaining a high temperature in the fusing and coalescing step.

The pressure sensitive adhesive base particles having a core-shell structure are produced through the following steps, for example:

after an aggregated particle dispersion is obtained, a step of mixing the aggregated particle dispersion and a styrene resin particle dispersion so that the styrene resin particles further attach to the surfaces of the aggregated particles and form second aggregated particles; and a step of heating the second aggregated particle dispersion in which the second aggregated particles are dispersed so as to fuse and coalesce the second aggregated particles and thereby form pressure sensitive adhesive base particles having a core-shell structure.

The pressure sensitive adhesive base particles having a core-shell structure obtained through the aforementioned steps have a shell layer containing a styrene resin. Instead of the styrene resin particle dispersion, a resin particle dispersion in which a different type of resin particles are dispersed may be used to form a shell layer that contains the different type of resin.

After completion of the fusing and coalescing step, the pressure sensitive adhesive base particles formed in the solution are subjected to a washing step, a solid-liquid separation step, and a drying step known in the art so as to obtain a dry pressure sensitive adhesive base particles. From the viewpoint of chargeability, the washing step may involve thorough displacement washing with ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The pressure sensitive adhesive particles of this exemplary embodiment are formed by, for example, adding an external additive to the obtained dry pressure sensitive adhesive base particles, and mixing the resulting mixture. Mixing may be performed by using a V blender, a HENSCHEL mixer, a Lodige mixer, or the like. Furthermore, if needed, a vibrating screen, an air screen, or the like may be used to remove coarse particles in the pressure sensitive adhesive particles.

Cartridge

A cartridge, which is one example of a particle conveying device according to an exemplary embodiment, stores the pressure sensitive adhesive particles of the exemplary embodiment and is detachably attachable to a printed material producing apparatus serving as one example of the image forming apparatus.

When the cartridge is attached to a printed material producing apparatus, the cartridge connects, via a supply pipe, to an applying section that constitutes a part of the printed material producing apparatus and that applies the pressure sensitive adhesive particle to a recording medium. When the pressure sensitive adhesive particle is supplied from the cartridge to the applying section and the pressure sensitive adhesive particle level in the cartridge has run low, the cartridge is replaced.

The cartridge will now be described through a specific example. For the convenience of describing the respective parts, the arrow x, the arrow y, and the arrow z indicated in FIGS. 4 to 7 are respectively defined as a device width direction, a device horizontal direction, and a device depth direction.

Figure 4:
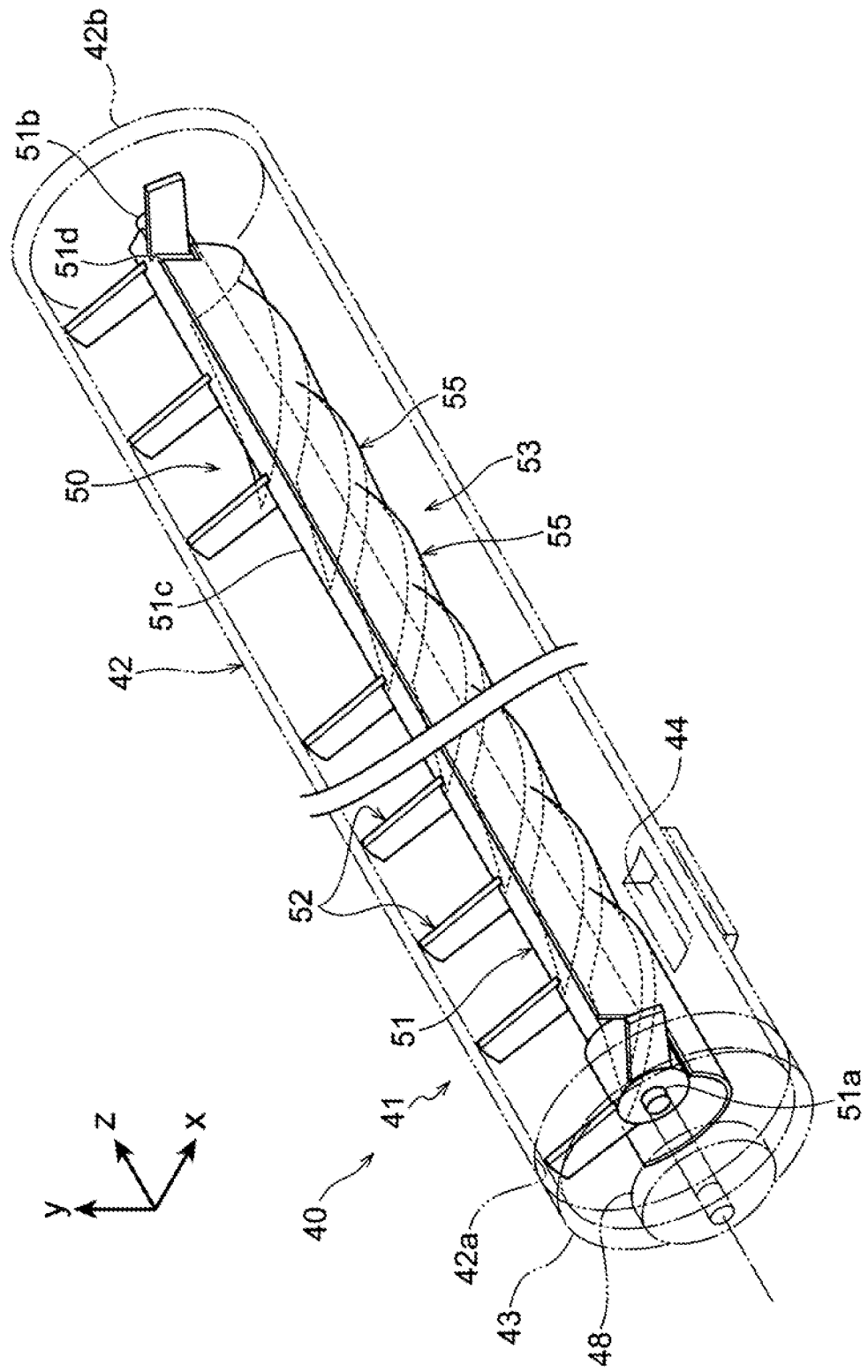
FIG. 4 is a perspective view of one example of a cartridge according to an exemplary embodiment.

As illustrated in FIGS. 4 and 5, a cartridge 40, which is one model of the cartridge of the exemplary embodiment, is equipped with a storage portion 41, a film auger 50, and a coupling 48.

The storage portion 41 is a member that stores the pressure sensitive adhesive particles of the exemplary embodiment. The storage portion 41 extends in the device depth direction, and is equipped with a container body 42 having a bottomed cylinder shape and an opening in one end portion in the device depth direction, and a disk-shaped lid portion 43 that closes the opening. The opening and the bottom of the container body 42 are respectively referred to as an opening 42a and a bottom 42b. A supply port 44 connected to a supply pipe is formed in a peripheral wall of the container body 42 on the opening 42a side. The lid portion 43 has a bearing portion 43a formed therein. The bearing portion 43a is a through hole that penetrates the lid portion 43 in the thickness direction and rotatably supports a shaft portion 51 via bearings or the like as described below. When the cartridge 40 is attached to the printed material production apparatus, the supply port 44 is opened, and the pressure sensitive adhesive particles can be supplied to the aforementioned supply pipe. In addition, when the cartridge 40 is in an attached state to the printed material production apparatus, the container body 42 is restrained by a restraining member (not illustrated in the drawings) so that the container body 42 does not rotate. When the cartridge 40 is in a detached state from the printed material production apparatus, the supply port 44 is sealed with a shutter not illustrated in the drawings.

The film auger 50 is installed in the storage portion 41 and rotates about a shaft extending in the device width direction in the storage portion 41 so as to convey the pressure sensitive adhesive particles in the storage portion 41 from the bottom 42b side toward the opening 42a side. The film auger 50 rotates clockwise as viewed from the bottom 42b of the container body 42. The film auger 50 is one example of a conveying member. The film auger 50 is equipped with a shaft portion 51, a stirring portion 52, and a film portion 53.

The shaft portion 51 is a rod member extending in the device depth direction. One end portion of the shaft portion 51 in the device depth direction is supported by the bearing portion 43a of the lid portion 43, and the other end is supported by the bottom 42b of the container body 42. One end portion and the other end portion of the shaft portion 51 are respectively referred to as an end portion 51a and an end portion 51b. The end portion 51a of the shaft portion 51 penetrates through the lid portion 43 and protrudes toward the outer side of the storage portion 41. Moreover, a portion between the two end portions of the shaft portion 51 in the device depth direction has a rectangular cross section, and has a side surface 51c facing in one direction selected from radial directions that intersect the device depth direction, and a side surface 51d that faces in a direction opposite to the side surface 51c.

The stirring portion 52 is disposed on the side surface 51c of the shaft portion 51, and is constituted by multiple plate-shaped members that are aligned along the device depth direction. The plate surfaces of the stirring portion 52 all face in the device depth direction. When the stirring portion 52 is viewed from the bottom 42b of the container body 42, the stirring portion is slanted such that tips of the plate-shaped members are positioned on the upstream side with respect to a line normal to the side surface 51c in the rotation direction of the film auger 50.

The film portion 53 is disposed on the side surface 51d of the shaft portion 51, and is a member constituted by a flexible resin film (for example, a PET film). The film portion 53 in a developed state illustrated in FIG. 5 has a substantially rectangular shape extending in the device depth direction. One end portion of the film portion 53 in the transverse direction is fixed to the side surface 51d of the shaft portion 51.

As illustrated in FIG. 5, the film portion 53 has incisions 54 that extend from the other end portion to the one end portion in the transverse direction and that are aligned in the device depth direction. The incisions 54 are slanted toward the end portion 51b with respect to the transverse direction of the film portion 53. The film portion 53 is divided into multiple blades 55 by the incisions 54.

As illustrated in FIG. 4, the film portion 53 inside the storage portion 41 is in a curved state along the inner surface of the container body 42. Specifically, when the film portion 53 is viewed from the bottom 42b of the container body 42, the free end of the film portion 53 is positioned on the upstream side in the rotation direction with respect to an imaginary line extended from the surface 51d toward the inner circumference of the container body 42, and a free end-side portion of the film portion 53 makes a surface contact with the inner surface of the container body 42.

The coupling 48 is disposed on the end portion 51a of the shaft portion 51 protruding from the lid portion 43 toward the outer side of the storage portion 41. When the cartridge 40 is in an attached state to the printed material production apparatus, a gear 48 meshes with a coupling installed in a driving section constituted by a motor and the like (not illustrated in the drawings) installed in the printed material production apparatus, and transmits the rotary force of the driving section to the shaft portion 51. As a result, the shaft portion 51 rotates about the axis (device depth direction) clockwise as viewed from the bottom 42b of the container body 42. The stirring portion 52 and the film portion 53 on the shaft portion 51 rotate clockwise along with the rotation of the shaft portion 51 about the shaft portion 51 as viewed from the bottom 42b of the container body 42. In other words, in the cartridge 40, the film auger 50 is rotated clockwise by the driving section (not illustrated) installed in the printed material production apparatus as viewed from the bottom 42b of the container body 42.

When the film auger 50 in the storage portion 41 containing the pressure sensitive adhesive particles rotates clockwise as viewed from the bottom 42b of the container body 42, the film auger 50 conveys the pressure sensitive adhesive particles in the storage portion 41 from the bottom 42b side to the opening 42a side. The pressure sensitive adhesive particles conveyed by the film auger 50 from the bottom 42b side to the opening 42a side are supplied to the applying section via the supply port 44 and the supply pipe connected to the supply port 44. Here, the supply port 44 is formed in the container body 42 on the opening 42a side, which is the downstream side of the film auger 50 in the conveying direction.

As illustrated in FIG. 6, the cartridge 40 may have a structure that includes a coil auger 60 instead of the film auger 50. The coil auger 60 is constituted by a wire formed into a hollow spiral shape extending in the device depth direction. As the coil auger 60 rotates about the axis of the spiral, the pressure sensitive adhesive particles in the storage portion 41 are conveyed from the bottom 42b side toward the opening 42a side. The coil auger 60 is one example of the conveying member.

According to the cartridge 40 containing the pressure sensitive adhesive particles of the exemplary embodiment having the aforementioned structure, aggregation of the pressure sensitive adhesive particles conveyed in the storage portion 41 is suppressed compared to when the sulfur content of the pressure sensitive adhesive particles is less than 0.1 mass % or more than 0.5 mass %.

Moreover, according to the cartridge 40 equipped with the film auger 50 or the coil auger 60, aggregation of the pressure sensitive adhesive particles conveyed in the storage portion 41 is suppressed compared to when the conveying member is an auger that has a blade that spirals about the rotation shaft.

The cartridge of the exemplary embodiment is not limited to a type that is equipped with the film auger 50 or the coil auger 60. For example, as illustrated in FIG. 7, a cartridge 140, which is another example of the cartridge of this exemplary embodiment, is equipped with an auger 70 instead of the film auger 50 of the cartridge 40. The auger 70 is equipped with a rotation shaft 71, a first blade 72, a loosening member 73, and a second blade 74. The rotation shaft 71 is a columnar member extending in the device depth direction. The first blade 72 is a spiral blade formed on the peripheral surface of the rotation shaft 71 on the bottom 42b side with respect to the supply port 44 in the device width direction. As the first blade 72 rotates about the rotation shaft 71, the pressure sensitive adhesive particles in the storage portion 41 are conveyed from the bottom 42b side toward the opening 42a side. The auger 70 equipped with the first blade 72 is one example of the conveying member. The loosening member 73 is disposed at a position on the rotation shaft 71 facing the supply port 44, and is constituted by multiple columnar rods 73a penetrating the rotation shaft 71 and protruding in the radial direction. In other words, the loosening member 73 is disposed on the downstream side of the auger 70 in the conveying direction. The respective rods 73a are disposed at different positions from one another in the device depth direction. In addition, the respective rods 73a are disposed at different angles with respect to adjacent rods 73a in the device depth direction as viewed in the device depth direction. The loosening member 73 rotates about the rotation shaft 71 so as to loosen the pressure sensitive adhesive particles (which have started to aggregate) conveyed by the first blade 72. The second blade 74 is a spiral blade formed on the peripheral surface of the rotation shaft 71 on the opening 42a side with respect to the supply port 44 in the device width direction. The second blade 74 rotates about the rotation shaft 71 and thereby conveys the pressure sensitive adhesive particles, which have been conveyed to the opening 42a side of the supply port 44 in the device depth direction, to the supply port 44 side. The cartridge 140 is identical in structure to the cartridge 40 except for the aforementioned features.

Moreover, according to the cartridge 140 equipped with the loosening member 73, aggregation of the pressure sensitive adhesive particles conveyed in the storage portion 41 is suppressed compared to when no loosening member 73 is provided.

The loosening member according to this exemplary embodiment is not limited to the one having the aforementioned structure as long as the loosening member is disposed on the downstream side of the conveying member in the conveying direction. The loosening member of the exemplary embodiment may be disposed on a rotation shaft that is provided to the supply port 44 and is different from the rotation shaft 71. The loosening member of the exemplary embodiment may be constituted by a brush or a coil auger. The loosening member is not limited to the one that loosens the pressure sensitive adhesive particles by rotation about the shaft, and may be a member that loosens the pressure sensitive adhesive particles by shaking, whirling, or reciprocal motions. In such a case, the loosening member may be constituted by a wire formed into a coil shape. Alternatively, in the structure equipped with the auger 70 illustrated in FIG. 7, the loosening member may be omitted.

The film auger 50 of the exemplary embodiment having the aforementioned structure is equipped with the stirring portion 52. Alternatively, the film auger 50 of the exemplary embodiment may be free of the stirring portion 52.

When the conveying member of the cartridge of the exemplary embodiment is a blade having a hollow spiral shape extending in the device depth direction or the coil auger 60, the cartridge may have a structure equipped with a cooling unit disposed in the hollow part of the conveying member so as to cool the hollow part. The cooling structure of the cooling unit may involve distributing (circulating) a liquid or gas that serves as a refrigerant in the hollow portion. The cartridge equipped with such a cooling unit suppresses adhesion of the pressure sensitive adhesive particles to the conveying member and the storage portion 41 compared to when no cooling unit is provided. The cooling method employed in the cooling unit may be air cooling or water cooling, and is not particularly limited.

The cartridge of the exemplary embodiment may have a structure equipped with a cooling unit that cools the storage portion 41. The cooling structure of this cooling unit may involve flowing a refrigerant such as gas toward the storage portion 41 by using, for example, a fan (not illustrated in the drawings) so that the refrigerant contacts the storage portion 41. Moreover, the cooling structure of the cooling unit may involve forming a refrigerant channel (not illustrated in the drawings), such as a duct or a tube, around the outer periphery of the storage portion 41 and distributing (circulating) a liquid or gas that serves as a refrigerant into the channel. The cartridge equipped with such a cooling unit suppresses adhesion of the pressure sensitive adhesive particles to the conveying member and the storage portion 41 compared to when no cooling unit is provided. The cooling method employed in the cooling unit may be air cooling or water cooling, and is not particularly limited.

In addition, the cartridge of the exemplary embodiment may have a structure in which the surface of the conveying member or the inner surface of the storage portion 41 is coated with a low-surface-energy material such as PTFE, zinc stearate, boron nitride, or melamine cyanurate. The cartridge in which the surface of the conveying member or the inner surface of the storage portion 41 is coated with a low-surface-energy material suppresses adhesion of the pressure sensitive adhesive particles to the conveying member or the storage portion 41 compared to when such a coating is not provided.

Alternatively, the cartridge of the exemplary embodiment may have irregularities on the surface of the conveying member or the inner surface of the storage portion 41 formed by surface treatment such as shot blasting. The cartridge in which the irregularities are formed on the surface of the conveying member or the inner surface of the storage portion 41 suppresses adhesion of the pressure sensitive adhesive particles to the conveying member or the storage portion 41 compared to when such irregularities are not provided.

Figure 3:
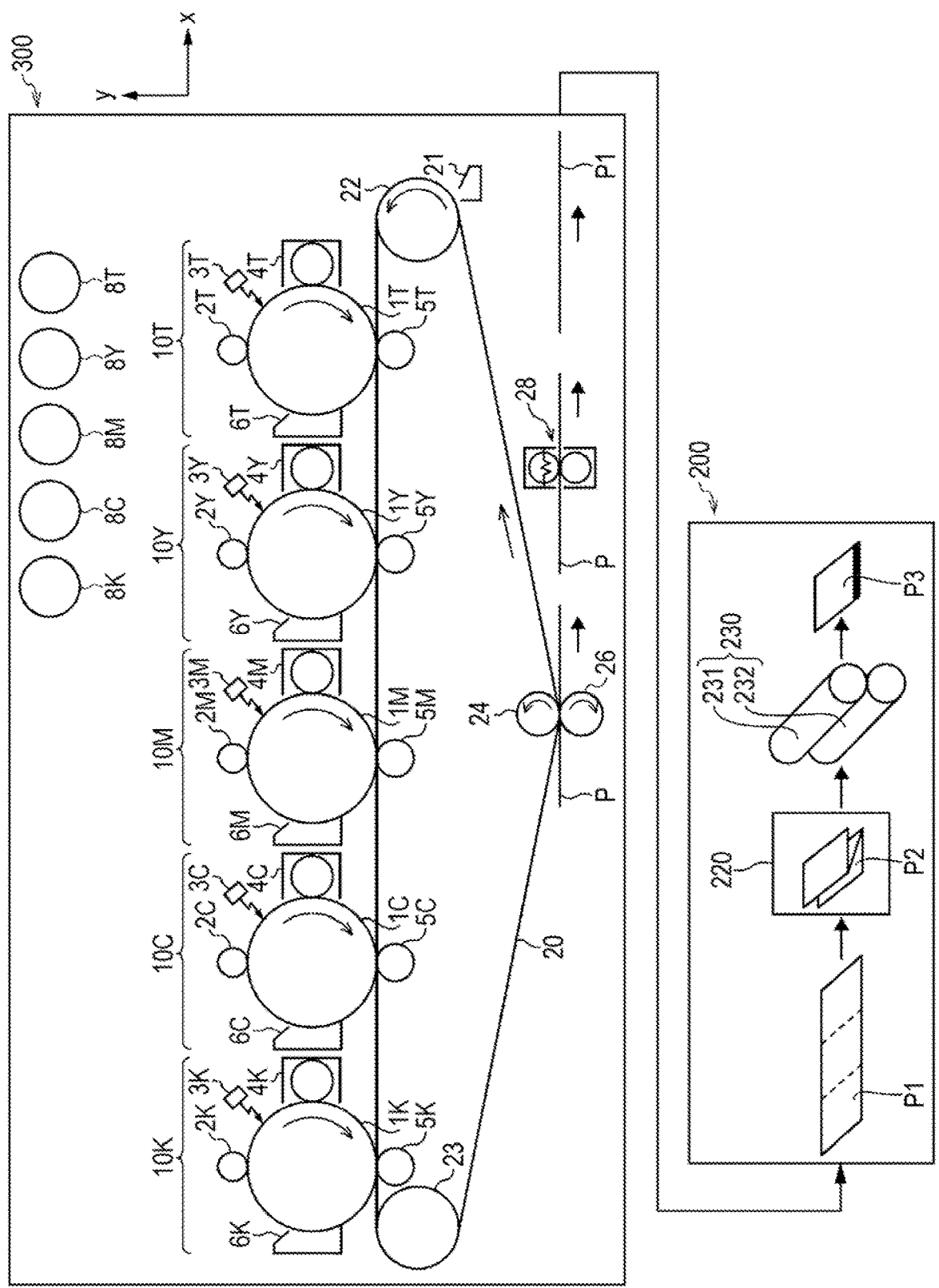
FIG. 3 is a schematic diagram of yet another example of an apparatus for producing a printed material according to an exemplary embodiment.

The cartridge of the exemplary embodiment described above may be used as the cartridge 8 of the printing section 300 illustrated in FIG. 3. Furthermore, the particle conveying device of the present disclosure is not limited to a structure used in a cartridge for supplying (replenishing) pressure sensitive adhesive particles. For example, the particle conveying device may be applied to a conveying system that conveys (and discards) the pressure sensitive adhesive particles in the printed material production apparatus or the printing section 300.

Apparatus and Method for Producing Printed Material, and Printed Material

An apparatus for producing a printed material according to an exemplary embodiment includes an applying section that stores the pressure sensitive adhesive particles of the exemplary embodiment and applies the pressure sensitive adhesive particles to a recording medium; and a pressure bonding section that folds and pressure-bonds the recording medium or pressure-bonds the recording medium and another recording medium placed on top of each other.

The applying section is equipped with, for example, a providing device that provides the pressure sensitive adhesive particles onto a recording medium, and a fixing device that fixes the pressure sensitive adhesive particles on the recording medium onto the recording medium.

The pressure bonding section is equipped with, for example, a folding device that folds a recording medium having the pressure sensitive adhesive particle applied thereto or a superimposing device that superimposes another recording medium on the recording medium having the pressure sensitive adhesive particles applied thereto; and a pressurizing device that pressurizes the folded recording medium or the recording media placed on top of each other.

The pressurizing device in the pressure bonding section applies a pressure to a recording medium having pressure sensitive adhesive particles applied thereto. In this manner, the pressure sensitive adhesive particles are fluidized and exhibit adhesiveness on the recording medium.

The pressure that the pressure bonding unit applies to the recording medium is preferably 3 MPa or more and 300 MPa or less, more preferably 10 MPa or more and 200 MPa or less, and yet more preferably 30 MPa or more and 150 MPa or less.

A method for producing a printed material of this exemplary embodiment is performed by using the apparatus for producing a printed material of this exemplary embodiment. The method for producing a printed material according to the exemplary embodiment includes an applying step of using the pressure sensitive adhesive particles of the exemplary embodiment and applying the pressure sensitive adhesive particles to a recording medium; and a pressure bonding step of folding and pressure-bonding the recording medium or pressure-bonding the recording medium and another recording medium placed on top of each other.

The applying step includes, for example, a step of providing the pressure sensitive adhesive particles onto a recording medium and may further include a step of fixing the pressure sensitive adhesive particles on the recording medium onto the recording medium.

The pressure bonding step includes, for example, a step of folding the recording medium or superimposing another recording medium on the recording medium, and a step of pressurizing the folded recording medium or the recording media placed on top of each other.

The pressure sensitive adhesive particles may be applied to the entire surface of the recording medium or one part of the recording medium. One layer or two or more layers of the pressure sensitive adhesive particles are applied to the recording medium. The layer of the pressure sensitive adhesive particles may be a layer continuous in the surface direction of the recording medium or a layer discontinuous in the surface direction of the recording medium. The layer of the pressure sensitive adhesive particles may be a layer in which the pressure sensitive adhesive particles are aligned as particles or a layer in which adjacent pressure sensitive adhesive particles are fused and aligned with each other.

The amount of the pressure sensitive adhesive particles (preferably, transparent pressure sensitive adhesive particles) on the recording medium and applied in the region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles (preferably, transparent pressure sensitive adhesive particles) on the recording medium is, for example, 0.2 μm or more and 25 μm or less, 0.4 μm or more and 20 μm or less, or 0.6 μm or more and 15 μm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces.

Among these, the recording medium may include at least one selected from the group consisting of paper and coated paper. The water absorption percentage of the recording medium is not particularly limited, and is, for example, 0.2 mass % or more and 1.5 mass % or less, preferably 0.3 mass % or more and 1.5 mass % or less, and more preferably 0.3 mass % or more and 1.2 mass % or less. The water absorption percentage of the recording medium refers to the rate of increase in the water content of the recording medium in a high-temperature, high-humidity environment (specifically, a temperature of 28° C. and a humidity of 85%) relative to the water content of the recording medium in a normal-temperature, normal-humidity environment (specifically, a temperature of 25° C. and a humidity of 50%) as measured by the same method for determining the water absorption percentage of the pressure sensitive adhesive particles.

Although some examples of the apparatus for producing a printed material according to the exemplary embodiment are described below, the exemplary embodiments are not limited to these.

FIG. 1 is a schematic diagram of an example of an apparatus for producing a printed material according to this exemplary embodiment. The apparatus for producing a printed material illustrated in FIG. 1 is equipped with an applying section 100 and a pressure bonding section 200 downstream of the applying section 100. The arrow indicates the direction in which the recording medium is conveyed.

The applying section 100 is a device that applies the pressure sensitive adhesive particles of the exemplary embodiment to a recording medium P. The recording medium P has an image formed on one or both surfaces in advance.

The applying section 100 is equipped with a providing device 110 and a fixing device 120 disposed downstream of the providing device 110.

The providing device 110 provides pressure sensitive adhesive particles M onto a recording medium P. Examples of the providing method employed by the providing device 110 include a spraying method, a bar coating method, a die coating method, a knife coating method, a roll coating method, a reverse roll coating method, a gravure coating method, a screen printing method, an ink jet method, a lamination method, and an electrophotographic method. Depending on the providing method, the pressure sensitive adhesive particles M may be dispersed in a dispersion medium to prepare a liquid composition, and the providing device 110 may use the liquid composition.

The recording medium P having the pressure sensitive adhesive particles M provided thereon by the providing device 110 is conveyed to the fixing device 120.

Examples of the fixing device 120 include a heating device that has a heating source and heats the pressure sensitive adhesive particles M on the recording medium P passing therethrough to fix the pressure sensitive adhesive particles M onto the recording medium P; a pressurizing device that has a pair of pressurizing members (roll/roll or belt/roll) and pressurizes the recording medium P passing therethrough to fix the pressure sensitive adhesive particles M onto the recording medium P; and a pressurizing and heating device that has a pair of pressurizing members (roll/roll or belt/roll) equipped with a built-in heating source and pressurizes and heats the recording medium P passing therethrough to fix the pressure sensitive adhesive particles M onto the recording medium P.

When the fixing device 120 has a heating source inside, the surface temperature of the recording medium P heated by the fixing device 120 is preferably 10° C. or more and 80° C. or less, more preferably 20° C. or more and 60° C. or less, and yet more preferably 30° C. or more and 50° C. or less.

When the fixing device 120 has a pressurizing member, the pressure applied to the recording medium P from the pressurizing member may be lower than the pressure applied to the recording medium P2 from the pressurizing device 230.

The recording medium P passes the applying section 100 and thus becomes a recording medium P1 having pressure sensitive adhesive particles M provided on the image. The recording medium P1 is conveyed toward the pressure bonding section 200.

In the apparatus for producing a printed material according to this exemplary embodiment, the applying section 100 and the pressure bonding section 200 may be close to each other or distant from each other. When the applying section 100 and the pressure bonding section 200 are distant from each other, the applying section 100 and the pressure bonding section 200 are, for example, linked via a conveying section (for example, a belt conveyor) that conveys the recording medium P1.

The pressure bonding section 200 is equipped with a folding device 220 and a pressurizing device 230, and folds and pressure-bonds the recording medium P1.

The folding device 220 folds the recording medium P1 passing therethrough to prepare a folded recording medium P2. The way in which the recording medium P2 is folded may be in two, in three, or in four, and only part of the recording medium P2 may be in fold. The recording medium P2 is in a state in which the pressure sensitive adhesive particles M are applied to at least part of at least one surface of opposing two surfaces of flaps.

The folding device 220 may have a pair of pressurizing members (for example, roll/roll or belt/roll) that apply a pressure to the recording medium P2. The pressure which the pressurizing members of the folding device 220 apply to the recording medium P2 may be lower than the pressure which the pressurizing device 230 applies to the recording medium P2.

The pressure bonding section 200 may be equipped with a superimposing device that places another medium on top of the recording medium P1 instead of the folding device 220. The form of superimposition of the recording medium P1 and another recording medium may be such that one recording medium is superimposed on the recording medium P1 or that one recording medium is superimposed on each of multiple sections of the recording medium P1. This other recording medium may have an image formed on one or both surfaces in advance, may be free of any image, or may be a pressure-bonded printed material prepared in advance.

The recording medium P2 exits the folding device 220 (or superimposing device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls and may be a combination of a pressurizing roll and a pressurizing belt or a combination of a pressurizing belt and a pressurizing belt.

When a pressure is applied to the recording medium P2 passing the pressurizing device 230, the pressure sensitive adhesive particles M on the recording medium P2 are fluidized under pressure and exhibit adhesiveness.

The pressurizing device 230 may have a heating source (for example, a halogen heater) inside for heating the recording medium P2, but this is optional. The pressurizing device 230 may have no heating source inside, and this does not exclude that the temperature inside the pressurizing device 230 increases to a temperature equal to or more than the environment temperature due to heat from a motor in the pressurizing device 230 or the like.

As the recording medium P2 passes the pressurizing device 230, the surfaces of the overlapping flaps of the recording medium P2 become bonded with each other with the pressure sensitive adhesive particles M, and a pressure-bonded printed material P3 is obtained. Two opposing surfaces of the flaps of the pressure-bonded printed material P3 are bonded to each other partly or entirely.

The finished pressure-bonded printed material P3 is discharged from the pressurizing device 230.

A first model of the pressure-bonded printed material P3 is a pressure-bonded printed material in which a folded recording medium has opposing surfaces of flaps bonded to each other with the pressure sensitive adhesive particles M. The pressure-bonded printed material P3 of this model is produced by the apparatus for producing a printed material equipped with a folding device 220.

A second model of the pressure-bonded printed material P3 is a pressure-bonded printed material in which multiple recording media placed on top of each other have opposing surfaces bonded to each other with the pressure sensitive adhesive particles M. The pressure-bonded printed material P3 of this model is produced by the pressure-bonded printed material producing apparatus equipped with a superimposing device.

The apparatus for producing a printed material according to this exemplary embodiment is not limited to a type that continuously conveys the recording medium P2 from the folding device 220 (or superimposing device) to the pressurizing device 230. The apparatus for producing a printed material according to this exemplary embodiment may be of a type that stocks the recording media P2 discharged from the folding device 220 (or superimposing device) and conveys the recording media P2 to the pressurizing device 230 after a predetermined amount of the recording media P2 are stored.

In the apparatus for producing a printed material according to this exemplary embodiment, the folding device 220 (or superimposing device) and the pressurizing device 230 may be close to each other or distant from each other. When the folding device 220 (or superimposing device) and the pressurizing device 230 are distant from each other, the folding device 220 (of superimposing device) and the pressurizing device 230 are, for example, linked via a conveying section (for example, a belt conveyor) that conveys the recording medium P2.

The apparatus for producing a printed material according to this exemplary embodiment may be equipped with a cutting section that cuts the recording medium into a predetermined size. Examples of the cutting section include a cutting section that is disposed between the applying section 100 and the pressure bonding section 200 and cuts off a part of the recording medium P1, the part being a region where no pressure sensitive adhesive particles M are applied; a cutting section that is disposed between the folding device 220 and the pressurizing device 230 and cuts off a part of the recording medium P2, the part being a region where no pressure sensitive adhesive particles M are applied; and a cutting section that is disposed downstream of the pressure bonding section 200 and cuts off a part of the pressure-bonded printed material P3, the part being a region not bonded with the pressure sensitive adhesive particles M.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size.

The apparatus for producing a printed material (image forming apparatus) according to this exemplary embodiment may further include a color image forming section (image forming unit) that forms a color image on a recording medium by using a coloring material. Examples of the color image forming section include a section that forms a color ink image on a recording medium by an inkjet method using a color ink as a coloring material, and a section that electrophotographically forms a color image on a recording medium by using a color electrostatic charge image developer.

The above-described production apparatus is used to implement the method for producing a printed material of the exemplary embodiment, the method further including a color image forming step of forming a color image on the recording medium by using a coloring material. Examples of the color image forming step include a step of forming a color ink image on a recording medium by an inkjet method using a color ink as a coloring material, and a step of electrophotographically forming a color image on a recording medium by using a color electrostatic charge image developer.

Sheet for Producing Printed Material and Method for Producing Sheet for Producing Printed Material A sheet for producing a printed material according to an exemplary embodiment includes a substrate and pressure sensitive adhesive particles applied to the substrate. The sheet for producing a printed material according to this exemplary embodiment is produced by using the pressure sensitive adhesive particles of the exemplary embodiment. The pressure sensitive adhesive particles on the substrate may or may not keep the particle shape from before being applied to the substrate.

The sheet for producing a printed material according to this exemplary embodiment serves as, for example, a masking sheet to be placed on and bonded to a recording medium to conceal information recorded on the recording medium, or as a releasing sheet used to form an adhesive layer on a recording medium when recording media placed on top of each other are to be bonded.

Examples of the substrate that serves as the sheet for producing a printed material according to the exemplary embodiment include paper, coated paper obtained by coating the surface of paper with a resin or the like, cloths, nonwoven cloths, resin films, and resin sheets. The substrate may have an image formed on one or both surfaces.

In the sheet for producing a printed material according to this exemplary embodiment, the pressure sensitive adhesive particles may be applied to the entire surface of or one part of the substrate. One layer or two or more layers of the pressure sensitive adhesive particles are applied to the substrate. The layer of the pressure sensitive adhesive particles may be a layer continuous in the surface direction of the substrate or a layer discontinuous in the surface direction of the substrate. The layer of the pressure sensitive adhesive particles may be a layer in which the pressure sensitive adhesive particles are aligned as particles or a layer in which adjacent pressure sensitive adhesive particles are fused and aligned with each other.

The amount of the pressure sensitive adhesive particles on the substrate applied in the region is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The thickness of the layer of the pressure sensitive adhesive particles on the substrate is, for example, 0.2 µm or more and 25 µm or less, 0.4 µm or more and 20 µm or less, or 0.6 µm or more and 15 µm or less.

The sheet for producing a printed material according to the exemplary embodiment is produced by, for example, a production method that includes an applying step of using the pressure sensitive adhesive particles of the exemplary embodiment and applying the pressure sensitive adhesive particles to a substrate.

The applying step includes, for example, a providing step of providing the pressure sensitive adhesive particles onto a recording medium and a fixing step of fixing the pressure sensitive adhesive particles on the recording medium onto the recording medium.

The providing step is performed by a providing method such as a spraying method, a bar coating method, a die coating method, a knife coating method, a roll coating method, a reverse roll coating method, a gravure coating method, a screen printing method, an ink jet method, a lamination method, or an electrophotographic method, for example. Depending on the providing method employed in the providing step, the pressure sensitive adhesive particles may be dispersed in a dispersion medium to prepare a liquid composition, and the liquid composition may be used the providing step.

The fixing step is, for example, a heating step of heating pressure sensitive adhesive particles on the substrate with a heating source to fix the pressure sensitive adhesive particles onto the substrate; a pressurizing step of pressurizing the substrate having the pressure sensitive adhesive particles provided thereon with a pair of pressurizing members (roll/roll or belt/roll) to fix the pressure sensitive adhesive particles onto the substrate; or a pressurizing and heating step of pressurizing and heating a substrate having the pressure sensitive adhesive particles provided thereon with a pair of pressurizing members (roll/roll or belt/roll) to fix the pressure sensitive adhesive particles onto the substrate.

Producing Printed Material by Electrophotographic Method

An exemplary embodiment in which the pressure sensitive adhesive particles of the exemplary embodiment are used in the electrophotographic method will now be described. In the electrophotographic method, the pressure sensitive adhesive particles correspond to a toner.

Electrostatic Charge Image Developer

An electrostatic charge image developer of this exemplary embodiment contains at least the pressure sensitive adhesive particles of the exemplary embodiment. The electrostatic charge image developer of the exemplary embodiment may be a one-component developer that contains only the pressure sensitive adhesive particles of the exemplary embodiment or a two-component developer that is a mixture of the pressure sensitive adhesive particles of the exemplary embodiment and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two-component developer, the pressure sensitive adhesive particle-to-carrier mixing ratio (mass ratio) is preferably 1:100 to 30:100 and is more preferably 3:100 to 20:100.

Apparatus and Method for Producing Printed Material

An apparatus for producing a printed material according to an exemplary embodiment that employs an electrophotographic method includes an applying section that stores a developer that contains the pressure sensitive adhesive particles of the exemplary embodiment and electrophotographically applies the pressure sensitive adhesive particles to a recording medium; and a pressure bonding section that folds and pressure-bonds the recording medium or pressure-bonds the recording medium and another recording medium placed on top of each other.

The method for producing a printed material of this exemplary embodiment by an electrophotographic method is performed by using the apparatus for producing a printed material of this exemplary embodiment.

The method for producing a printed material according to an exemplary embodiment includes an applying step of electrophotographically applying pressure sensitive adhesive particles of the exemplary embodiment to a recording medium by using a developer that contains the pressure sensitive adhesive particles; and a pressure bonding step of folding and pressure-bonding the recording medium or pressure-bonding the recording medium and another recording medium placed on top of each other.

The applying section included in the apparatus for producing a printed material according to this exemplary embodiment includes, for example, a photoreceptor, a charging section that charges a surface of the photoreceptor, an electrostatic charge image forming section that forms an electrostatic charge image on the charged surface of the photoreceptor, a developing section that stores the electrostatic charge image developer of the exemplary embodiment and develops the electrostatic charge image on the surface of the photoreceptor into a pressure sensitive adhesive particle portion, which is a layer of the pressure sensitive adhesive particles, by using the electrostatic charge image developer, and a transfer section that transfers the pressure sensitive adhesive particle portion on the surface of the photoreceptor onto a surface of a recording medium.

The applying section may further include a fixing section that fixes the pressure sensitive adhesive particle portion which has been transferred onto the surface of the recording medium.

The applying step included in the method for producing a printed material according to this exemplary embodiment includes, for example, a charging step of charging a surface of the photoreceptor, an electrostatic charge image forming step of forming an electrostatic charge image on the charged surface of the photoreceptor, a developing step of developing the electrostatic charge image on the surface of the photoreceptor into a pressure sensitive adhesive particle portion by using the electrostatic charge image developer of the exemplary embodiment, and a transfer step of transferring the pressure sensitive adhesive particle portion on the surface of the photoreceptor onto a surface of a recording medium.

The applying step may further include a fixing step of fixing the pressure sensitive adhesive particle portion which has been transferred onto the surface of the recording medium.

The applying section is, for example, a direct transfer type device with which a pressure sensitive adhesive particle portion on the surface of the photoreceptor is directly transferred onto a recording medium; an intermediate transfer type device with which a pressure sensitive adhesive particle portion on the surface of the photoreceptor is first transferred onto a surface of an intermediate transfer body and then the pressure sensitive adhesive particle portion on the intermediate transfer body is transferred onto a surface of a recording medium; a device equipped with a cleaning section that cleans the surface of the photoreceptor before charging and after the transfer of the pressure sensitive adhesive particle portion; and a device equipped with a charge erasing section that erases charges on the surface of the photoreceptor by applying charge erasing light after the transfer of the pressure sensitive adhesive particle portion and before charging. When the applying section is of an intermediate transfer type, the transfer section includes, for example, an intermediate transfer body having a surface onto which a pressure sensitive adhesive particle portion is transferred, a first transfer section that transfers the pressure sensitive adhesive particle portion on the surface of the photoreceptor onto the surface of the intermediate transfer body, and a second transfer section that transfers the pressure sensitive adhesive particle portion on the surface of the intermediate transfer body onto a surface of a recording medium.

A portion of the applying section that includes the developing section may be configured as a cartridge structure (process cartridge) that is detachably attachable to the applying section. A process cartridge that stores the electrostatic charge image developer of the exemplary embodiment and is equipped with a developing section, for example, is suitable as this process cartridge.

The pressure bonding section included in the apparatus for producing a printed material according to this exemplary embodiment applies a pressure to a recording medium to which the pressure sensitive adhesive particles of the exemplary embodiment are applied. In this manner, the pressure sensitive adhesive particles of the exemplary embodiment become fluidized and exhibit adhesiveness on the recording medium. The pressure that the pressure bonding section applies to the recording medium to fluidize the pressure sensitive adhesive particles of the exemplary embodiment is preferably 3 MPa or more and 300 MPa or less, more preferably 10 MPa or more and 200 MPa or less, and yet more preferably 30 MPa or more and 150 MPa or less.

The pressure sensitive adhesive particles of the exemplary embodiment may be applied to the entire surface of the recording medium or one part of the recording medium. One layer or two or more layers of the pressure sensitive adhesive particles of the exemplary embodiment are applied to the recording medium. The layer of the pressure sensitive adhesive particles of the exemplary embodiment may be a layer continuous in the surface direction of the recording medium or a layer discontinuous in the surface direction of the recording medium.

The amount of the pressure sensitive adhesive particles of the exemplary embodiment on the recording medium in the applied region is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of the pressure sensitive adhesive particles of the exemplary embodiment on the recording medium is, for example, 0.2 μm or more and 25 μm or less, 0.4 μm or more and 20 μm or less, or 0.6 μm or more and 15 μm or less.

Examples of the recording medium used in the apparatus for producing a printed material according to this exemplary embodiment include paper, coated paper obtained by coating the surface of paper with a resin or the like, cloths, nonwoven cloths, resin films, and resin sheets. The recording medium may have an image on one surface or both surfaces. Among these, the recording medium may include at least one selected from the group consisting of paper and coated paper. The water absorption percentage of the recording medium is not particularly limited, and is, for example, 0.2 mass % or more and 1.5 mass % or less, preferably 0.3 mass % or more and 1.5 mass % or less, and more preferably 0.3 mass % or more and 1.2 mass % or less. The water absorption percentage of the recording medium refers to the rate of increase in the water content of the recording medium in a high-temperature, high-humidity environment (specifically, a temperature of 28° C. and a humidity of 85%) relative to the water content of the recording medium in a normal-temperature, normal-humidity environment (specifically, a temperature of 25° C. and a humidity of 50%) as measured by the same method for determining the water absorption percentage of the pressure sensitive adhesive particles.

Although some examples of the apparatus for producing a printed material according to the exemplary embodiment employing an electrophotographic system are described below, the exemplary embodiments are not limited to these.

Figure 2:
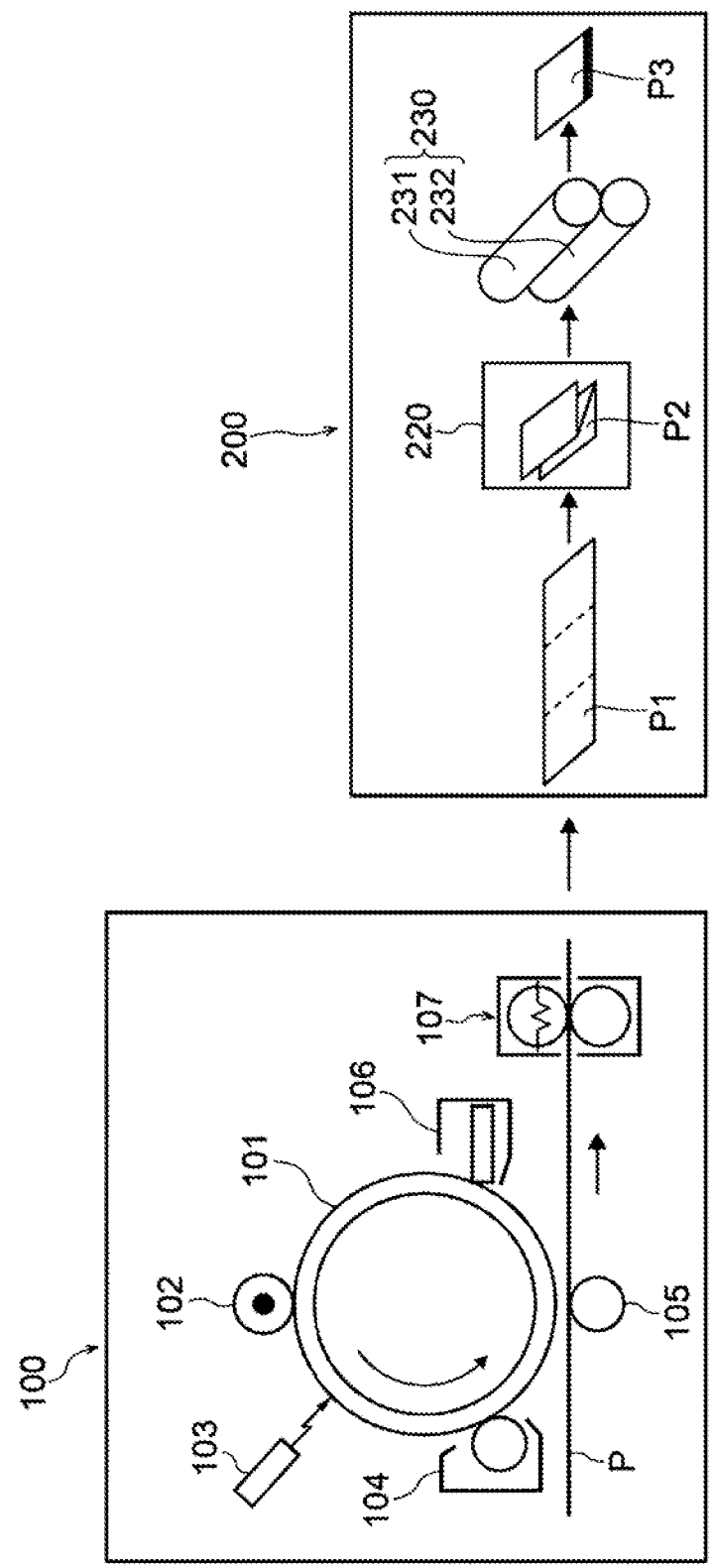
FIG. 2 is a schematic diagram of another example of an apparatus for producing a printed material according to an exemplary embodiment.

FIG. 2 is a schematic diagram of an example of an apparatus for producing a printed material according to this exemplary embodiment. The apparatus for producing a printed material illustrated in FIG. 2 is equipped with an applying section 100 and a pressure bonding section 200 downstream of the applying section 100. The arrow indicates the direction in which the photoreceptor rotates or the recording medium is conveyed.

The applying section 100 is of a direct transfer type and uses a developer containing the pressure sensitive adhesive particles of the exemplary embodiment to electrophotographically apply the pressure sensitive adhesive particles of the exemplary embodiment to a recording medium P. The recording medium P has an image formed on one or both surfaces in advance.

The applying section 100 includes a photoreceptor 101. A charging roll (one example of the charging section) 102 that charges the surface of the photoreceptor 101, an exposing device (one example of the electrostatic charge image forming section) 103 that forms an electrostatic charge image by exposing the charged surface of the photoreceptor 101 with a laser beam, a developing device (one example of the developing section) 104 that develops the electrostatic charge image by supplying pressure sensitive adhesive particles to the electrostatic charge image, a transfer roll (one example of the transfer section) 105 that transfers the developed pressure sensitive adhesive particle portion onto the recording medium P, and a photoreceptor cleaning device (one example of the cleaning section) 106 that removes the pressure sensitive adhesive particles remaining on the surface of the photoreceptor 101 after the transfer are disposed around the photoreceptor 101.

The operation of the applying section 100 applying the pressure sensitive adhesive particles of the exemplary embodiment to the recording medium P will now be described.

First, the surface of the photoreceptor 101 is charged by the charging roll 102. The exposing device 103 applies a laser beam onto the charged surface of the photoreceptor 101 in accordance to image data sent from a controller (not illustrated). As a result, an electrostatic charge image of an application pattern of the pressure sensitive adhesive particles of this exemplary embodiment is formed on the surface of the photoreceptor 101.

The electrostatic charge image formed on the photoreceptor 101 is rotated to a developing position as the photoreceptor 101 is run. The electrostatic charge image on the photoreceptor 101 is developed by the developing device 104 at this developing position so as to form a pressure sensitive adhesive particle portion.

A developer that contains at least the pressure sensitive adhesive particles of this exemplary embodiment and a carrier is stored in the developing device 104. The pressure sensitive adhesive particles of this exemplary embodiment are frictionally charged as they are stirred with the carrier in the developing device 104, and are carried on the developer roll. As the surface of the photoreceptor 101 passes the developing device 104, the pressure sensitive adhesive particles electrostatically adhere to the electrostatic charge image on the surface of the photoreceptor 101, and the electrostatic charge image is thereby developed with the pressure sensitive adhesive particles. The photoreceptor 101 on which the pressure sensitive adhesive particle portion is formed is continuously run, and the developed pressure sensitive adhesive particle portion on the photoreceptor 101 is conveyed to a transfer position.

After the pressure sensitive adhesive particle portion on the photoreceptor 101 is conveyed to the transfer position, a transfer bias is applied to the transfer roll 105. An electrostatic force working from the photoreceptor 101 toward the transfer roll 105 also acts on the pressure sensitive adhesive particle portion, and, thus, the pressure sensitive adhesive particle portion on the photoreceptor 101 is transferred onto the recording medium P.

The pressure sensitive adhesive particles remaining on the photoreceptor 101 are removed by the photoreceptor cleaning device 106 and recovered. The photoreceptor cleaning device 106 is, for example, a cleaning blade or a cleaning brush. From the viewpoint of suppressing the phenomenon in which the pressure sensitive adhesive particles of the exemplary embodiment remaining on the surface of the photoreceptor fluidize under a pressure and attach to the surface of the photoreceptor while forming a film, the photoreceptor cleaning device 106 may be a cleaning brush.

The recording medium P onto which the pressure sensitive adhesive particle portion has been transferred is conveyed to a fixing device (one example of the fixing section) 107. The fixing device 107 is, for example, a pair of fixing members (roll/roll or belt/roll). The applying section 100 is not necessarily equipped with a fixing device 107; however, from the viewpoint of suppressing detachment of the pressure sensitive adhesive particles of the exemplary embodiment from the recording medium P, the applying section 100 is preferably equipped with a fixing device 107. The pressure which the fixing device 107 applies to the recording medium P may be lower than the pressure which the pressurizing device 230 applies to the recording medium P, and may specifically be 0.2 MPa or more and 1 MPa or less.

The fixing device 107 may have a heating source (for example, a halogen heater) for heating the recording medium P inside, but this is optional. When the fixing device 107 has a heating source inside, the surface temperature of the recording medium P heated by the heating source is preferably 150° C. or more and 220° C. or less, more preferably 155° C. or more and 210° C. or less, and yet more preferably 160° C. or more and 200° C. or less. The fixing device 107 may have no heating source inside, and this does not exclude that the temperature inside the fixing device 107 increases to a temperature equal to or more than the environment temperature due to heat from a motor in the applying section 100 or the like.

The recording medium P passes the applying section 100 and thus becomes a recording medium P1 having pressure sensitive adhesive particles of the exemplary embodiment provided on the image. The recording medium P1 is conveyed toward the pressure bonding section 200.

In the apparatus for producing a printed material according to this exemplary embodiment, the applying section 100 and the pressure bonding section 200 may be close to each other or distant from each other. When the applying section 100 and the pressure bonding section 200 are distant from each other, the applying section 100 and the pressure bonding section 200 are, for example, linked via a conveying section (for example, a belt conveyor) that conveys the recording medium P1.

The pressure bonding section 200 is equipped with a folding device 220 and a pressurizing device 230, and folds and pressure-bonds the recording medium P1.

The folding device 220 folds the recording medium P1 passing therethrough to prepare a folded recording medium P2. The way in which the recording medium P2 is folded may be in two, in three, or in four, and only part of the recording medium P2 may be in fold. The recording medium P2 is in a state in which the pressure sensitive adhesive particles of the exemplary embodiment are applied to at least part of at least one surface of opposing two surfaces of flaps.

The folding device 220 may have a pair of pressurizing members (for example, roll/roll or belt/roll) that apply a pressure to the recording medium P2. The pressure which the pressurizing members of the folding device 220 apply to the recording medium P2 may be lower than the pressure which the pressurizing device 230 applies to the recording medium P2, and may specifically be 1 MPa or more and 10 MPa or less.

The pressure bonding section 200 may be equipped with a superimposing device that places another medium on top of the recording medium P1 instead of the folding device 220. The form of superimposition of the recording medium P1 and another recording medium may be such that one recording medium is superimposed on the recording medium P1 or that one recording medium is superimposed on each of multiple sections of the recording medium P1. This other recording medium may have an image formed on one or both surfaces in advance, may be free of any image, or may be a pressure-bonded printed material prepared in advance.

The recording medium P2 exits the folding device 220 (or superimposing device) and is conveyed toward the pressurizing device 230.

The pressurizing device 230 is equipped with a pair of pressurizing members (in other words, pressurizing rolls 231 and 232). The pressurizing roll 231 and the pressurizing roll 232 contact and push each other at their outer peripheral surfaces to apply a pressure onto the passing recording medium P2. The pair of pressurizing members in the pressurizing device 230 is not limited to the combination of pressurizing rolls and may be a combination of a pressurizing roll and a pressurizing belt or a combination of a pressurizing belt and a pressurizing belt.

When a pressure is applied to the recording medium P2 passing the pressurizing device 230, the pressure sensitive adhesive particles of the exemplary embodiment on the recording medium P2 are fluidized under pressure and exhibit adhesiveness. The pressure that the pressurizing device 230 applies to the recording medium P2 is preferably 3 MPa or more and 300 MPa or less, more preferably 10 MPa or more and 200 MPa or less, and yet more preferably 30 MPa or more and 150 MPa or less.

The pressurizing device 230 may have a heating source (for example, a halogen heater) inside for heating the recording medium P2, but this is optional. When the pressurizing device 230 has a heating source inside, the surface temperature of the recording medium P2 heated by the heating source is preferably 30° C. or more and 120° C. or less, more preferably 40° C. or more and 100° C. or less, and yet more preferably 50° C. or more and 90° C. or less. The pressurizing device 230 may have no heating source inside, and this does not exclude that the temperature inside the pressurizing device 230 increases to a temperature equal to or more than the environment temperature due to heat from a motor in the pressurizing device 230 or the like.

As the recording medium P2 passes the pressurizing device 230, the surfaces of the overlapping flaps of the recording medium P2 become bonded with each other with the pressure sensitive adhesive particles of the exemplary embodiment, and a pressure-bonded printed material P3 is obtained. The opposing surfaces of the overlapping flaps of the pressure-bonded printed material P3 are partly or entirely bonded to each other.

The finished pressure-bonded printed material P3 is discharged from the pressurizing device 230.

A first model of the pressure-bonded printed material P3 is a pressure-bonded printed material in which a folded recording medium has opposing surfaces of flaps bonded to each other with the pressure sensitive adhesive particles of the exemplary embodiment. The pressure-bonded printed material P3 of this model is produced by the apparatus for producing a printed material equipped with a folding device 220.

A second model of the pressure-bonded printed material P3 is a pressure-bonded printed material in which multiple recording media placed on top of each other have opposing surfaces bonded to each other with the pressure sensitive adhesive particles of the exemplary embodiment. The pressure-bonded printed material P3 of this model is produced by the pressure-bonded printed material producing apparatus equipped with a superimposing device.

The apparatus for producing a printed material according to this exemplary embodiment is not limited to a type that continuously conveys the recording medium P2 from the folding device 220 (or superimposing device) to the pressurizing device 230. The apparatus for producing a printed material according to this exemplary embodiment may be of a type that stocks the recording media P2 discharged from the folding device 220 (or superimposing device) and conveys the recording media P2 to the pressurizing device 230 after a predetermined amount of the recording media P2 are stored.

In the apparatus for producing a printed material according to this exemplary embodiment, the folding device 220 (or superimposing device) and the pressurizing device 230 may be close to each other or distant from each other. When the folding device 220 (or superimposing device) and the pressurizing device 230 are distant from each other, the folding device 220 (of superimposing device) and the pressurizing device 230 are, for example, linked via a conveying section (for example, a belt conveyor) that conveys the recording medium P2.

The apparatus for producing a printed material according to this exemplary embodiment may be equipped with a cutting section that cuts the recording medium into a predetermined size. Examples of the cutting section include a cutting section that is disposed between the applying section 100 and the pressure bonding section 200 and cuts off a part of the recording medium P1, the part being a region where no pressure sensitive adhesive particles of the exemplary embodiment are applied; a cutting section that is disposed between the folding device 220 and the pressurizing device 230 and cuts off a part of the recording medium P2, the part being a region where no pressure sensitive adhesive particles of the exemplary embodiment are applied; and a cutting section that is disposed downstream of the pressure bonding section 200 and cuts off a part of the pressure-bonded printed material P3, the part being a region not bonded with the pressure sensitive adhesive particles of the exemplary embodiment.

The apparatus for producing a printed material according to this exemplary embodiment is not limited to a single-sheet type. The apparatus for producing a printed material according to this exemplary embodiment may be of a type that performs an applying step and a pressure bonding step on a long recording medium to form a long pressure-bonded printed material, and then cuts the long pressure-bonded printed material into a predetermined size.

The apparatus for producing a printed material according to this exemplary embodiment may further include a color image forming section that forms a color image on a recording medium by an electrophotographic method by using a color electrostatic charge image developer. The color image forming section is equipped with, for example, a photoreceptor, a charging section that charges a surface of the photoreceptor, an electrostatic charge image forming section that forms an electrostatic charge image on the charged surface of the photoreceptor, a developing section that stores a color electrostatic charge image developer and develops the electrostatic charge image on the surface of the photoreceptor into a color toner image by using the color electrostatic charge image developer, a transfer section that transfers the color toner image on the surface of the photoreceptor onto a surface of a recording medium, and a thermal fixing section that thermally fixes the color toner image transferred onto the surface of the recording medium.

The above-described production apparatus is used to implement the method for producing a printed material of the exemplary embodiment, the method further including a color image forming step of forming a color image on the recording medium by an electrophotographic method using a color electrostatic charge image developer. The color image forming step includes, specifically, a charging step of charging a surface of a photoreceptor, an electrostatic charge image forming step of forming an electrostatic charge image on the charged surface of the photoreceptor, a developing step of developing the electrostatic charge image on the surface of the photoreceptor into a color toner image by using a color electrostatic charge image developer, a transfer step of transferring the color toner image on the surface of the photoreceptor onto a surface of a recording medium, and a thermal fixing step of thermally fixing the color toner image transferred onto the surface of the recording medium.

Examples of the color image forming section included in the apparatus for producing a printed material according to the exemplary embodiment include: a direct transfer type device with which a color toner image on the surface of the photoreceptor is directly transferred onto a recording medium; an intermediate transfer type device with which a color toner image on the surface of the photoreceptor is first transferred onto a surface of an intermediate transfer body and then the color toner image on the intermediate transfer body is transferred onto a surface of a recording medium; a device equipped with a cleaning section that cleans the surface of the photoreceptor before charging and after the transfer of the color toner image; and a device equipped with a charge erasing section that erases charges on the surface of the photoreceptor by applying charge erasing light after the transfer of the color toner image and before charging. When the color image forming section is an intermediate transfer type device, the transfer section has, for example, an intermediate transfer body having a surface to which a color toner image is transferred, a first transfer section that transfers (first transfer) the color toner image on the surface of the photoreceptor onto a surface of the intermediate transfer body, and a second transfer section that transfers (second transfer) the color toner image on the surface of the intermediate transfer body onto a surface of a recording medium.

In the apparatus for producing a printed material according to this exemplary embodiment, when the applying section for applying a developer containing the pressure sensitive adhesive particles of the exemplary embodiment and a color image forming section both employ an intermediate transfer method, the applying section and the color image forming section may share the intermediate transfer body and the second transfer section.

In the apparatus for producing a printed material according to this exemplary embodiment, the applying section that applies an image developer containing the pressure sensitive adhesive particles of the exemplary embodiment and the color image forming section may share the thermal fixing section. In other words, a thermal fixing section in the color image forming section may also serve as the fixing section of the applying section.

Other examples of the apparatus for producing a printed material according to the exemplary embodiment equipped with a color image forming section are described below, but these examples are not limiting. Only relevant parts illustrated in the drawing are described in the description below, and descriptions of other parts are omitted.

FIG. 3 is a schematic diagram of an example of an apparatus for producing a printed material according to this exemplary embodiment employing an electrophotographic system. The apparatus for producing a printed material illustrated in FIG. 3 is equipped with a printing section 300 that applies the pressure sensitive adhesive particles of the exemplary embodiment to a recording medium and forms a color image on the recording medium, and a pressure bonding section 200 disposed downstream of the printing section 300.

The printing section 300 is a five-stand-tandem intermediate transfer-type printing section. The printing section 300 is equipped with a unit 10T that applies the pressure sensitive adhesive particles (T) of the exemplary embodiment, and units 10Y, 10M, 10C, and 10K that respectively form yellow (Y), magenta (M), cyan (C), and black (K) images. The unit 10T is the applying section that applies the pressure sensitive adhesive particles of the exemplary embodiment to the recording medium P by using a developer that contains the pressure sensitive adhesive particles of the exemplary embodiment. Each of the units 10Y, 10M, 10C, and 10K is a section that forms a color image on the recording medium P by using a developer that contains a color toner. The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing section 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing sections) 4T, 4Y, 4M, 4C, and 4K. The pressure sensitive adhesive particles of the exemplary embodiment, a yellow toner, a magenta toner, a cyan toner, and a black toner stored in the cartridges 8T, 8Y, 8M, 8C, and 8K are respectively supplied to the developing devices 4T, 4Y, 4M, 4C, and 4K.

Since the units 10T, 10Y, 10M, 10C and 10K are identical in structure and in operation, the unit 10T that applies the pressure sensitive adhesive particles of this exemplary embodiment to the recording medium is described as a representative example.

The unit 10T has a photoreceptor 1T. A charging roll (one example of the charging section) 2T that charges the surface of the photoreceptor 1T, an exposing device (one example of the electrostatic charge image forming section) 3T that forms an electrostatic charge image by exposing the charged surface of the photoreceptor 1T with a laser beam, a developing device (one example of the developing section) 4T that develops the electrostatic charge image by supplying pressure sensitive adhesive particles to the electrostatic charge image, a first transfer roll (one example of the first transfer section) 5T that transfers the developed pressure sensitive adhesive particle portion onto the intermediate transfer belt 20, and a photoreceptor cleaning device (one example of the cleaning section) 6T that removes the pressure sensitive adhesive particles remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of applying the pressure sensitive adhesive particles of the exemplary embodiment and formation of a color image on the recording medium P is described by using the operation of the unit 10T as an example.

First, the surface of the photoreceptor 1T is charged by the charging roll 2T. The developing device 3T applies a laser beam onto the charged surface of the photoreceptor 1T in accordance to image data sent from a controller (not illustrated). As a result, an electrostatic charge image of an application pattern of the pressure sensitive adhesive particles of this exemplary embodiment is formed on the surface of the photoreceptor 1T.

The electrostatic charge image formed on the photoreceptor 1T is rotated to a developing position as the photoreceptor 1T is run. The electrostatic charge image on the photoreceptor 1T is developed by the developing device 4T at this developing position so as to form a pressure sensitive adhesive particle portion.

A developer that contains at least the pressure sensitive adhesive particles of this exemplary embodiment and a carrier is stored in the developing device 4T. The pressure sensitive adhesive particles of this exemplary embodiment are frictionally charged as they are stirred with the carrier in the developing device 4T, and are carried on the developer roll. As the surface of the photoreceptor 1T passes the developing device 4T, the pressure sensitive adhesive particles electrostatically adhere to the electrostatic charge image on the surface of the photoreceptor 1T, and the electrostatic charge image is thereby developed with the pressure sensitive adhesive particles. The photoreceptor 1T on which the pressure sensitive adhesive particle portion is formed is continuously run, and the developed pressure sensitive adhesive particle portion on the photoreceptor 1T is conveyed to a first transfer position.

After the pressure sensitive adhesive particle portion on the photoreceptor 1T is conveyed to the first transfer position, a first transfer bias is applied to the first transfer roll 5T. An electrostatic force working from the photoreceptor 1T toward the first transfer roll 5T also acts on the pressure sensitive adhesive particle portion, and, thus, the pressure sensitive adhesive particle portion on the photoreceptor 1T is transferred onto the intermediate belt 20. The pressure sensitive adhesive particles remaining on the photoreceptor 1T are removed by the photoreceptor cleaning device 6T and recovered. The photoreceptor cleaning device 6T is, for example, a cleaning blade or a cleaning brush, and is preferably a cleaning brush.

An operation similar to that performed in the unit 10T is also performed in the units 10Y, 10M, 10C, and 10K by using developers that contain color toners. The intermediate transfer belt 20 onto which the pressure sensitive adhesive particle portion of the exemplary embodiment has been transferred in the unit 10T sequentially passes the units 10Y, 10M, 10C, and 10K, and toner images of respective colors are transferred onto the intermediate transfer belt 20 in a superimposing manner.

The intermediate transfer belt 20 onto which the pressure sensitive adhesive particle portion and the toner images are transferred and superimposed as the intermediate transfer belt 20 passes the units 10T, 10Y, 10M, 10C, and 10K reaches a second transfer portion constituted by the intermediate transfer belt 20, the counter roll 24 in contact with the inner surface of the intermediate transfer belt 20, and a second transfer roll (one example of the second transfer section) 26 disposed on the image carrying surface side of the intermediate transfer belt 20. Meanwhile, a recording medium P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P acts on the pressure sensitive adhesive particle portion, and the pressure sensitive adhesive particle portion and the toner images on the intermediate transfer belt 20 are transferred onto the recording medium P.

The recording medium P onto which the pressure sensitive adhesive particle portion and the toner images have been transferred is conveyed to a thermal fixing device (one example of the thermal fixing section) 28. The thermal fixing device 28 is equipped with a heating source such as a halogen heater, and heats the recording medium P. The surface temperature of the recording medium P when heated by the thermal fixing device 28 is preferably 150° C. or more and 220° C. or less, more preferably 155° C. or more and 210° C. or less, and yet more preferably 160° C. or more and 200° C. or less. As the recording medium P passes the thermal fixing device 28, the color toner images and the pressure sensitive adhesive particle portion are thermally fixed to the recording medium P.

From the viewpoints of suppressing detachment of the pressure sensitive adhesive particles of the exemplary embodiment from the recording medium P and improving the fixability of the color image to the recording medium P, the thermal fixing device 28 may be a device that applies heat and pressure, for example, a pair of fixing members (roll/roll or belt/roll) equipped with a heating sources inside. When the thermal fixing device 28 is to apply pressure, the pressure which the thermal fixing device 28 applies to the recording medium P may be lower than the pressure which the pressurizing device 230 applies to the recording medium P2, and may specifically be 0.2 MPa or more and 1 MPa or less.

The recording medium P passes the printing section 300 and thus becomes a recording medium P1 on which color images and the pressure sensitive adhesive particles of the exemplary embodiment are provided. The recording medium P1 is conveyed toward the pressure bonding section 200.

The structure of the pressure bonding section 200 illustrated in FIG. 3 may be the same as that of the pressure bonding section 200 illustrated in FIG. 2, and the detailed descriptions of the structure and the operation of the pressure bonding section 200 are omitted.

In the apparatus for producing a printed material according to this exemplary embodiment, the printing section 300 and the pressure bonding section 200 may be close to each other or distant from each other. When the printing section 300 and the pressure bonding section 200 are distant from each other, the printing section 300 and the pressure bonding section 200 are, for example, linked via a conveying section (for example, a belt conveyor) that conveys the recording medium P1.

The apparatus for producing a printed material according to this exemplary embodiment may be equipped with a cutting section that cuts the recording medium into a predetermined size. Examples of the cutting section include a cutting section that is disposed between the printing section 300 and the pressure bonding section 200 and cuts off a part of the recording medium P1, the part being a region where no pressure sensitive adhesive particle portion of the exemplary embodiment is applied; a cutting section that is disposed between the folding device 220 and the pressurizing device 230 and cuts off a part of the recording medium P2, the part being a region where no pressure sensitive adhesive particle portion of the exemplary embodiment is applied; and a cutting section that is disposed downstream of the pressure bonding section 200 and cuts off a part of the pressure-bonded printed material P3, the part being a region not bonded with the pressure sensitive adhesive particle portion of the exemplary embodiment.

The apparatus for producing a printed material according to this exemplary embodiment is not limited to a single-sheet type. The apparatus for producing a printed material according to this exemplary embodiment may be of a type that performs a color image forming step, an applying step, and a pressure bonding step on a long recording medium to form a long pressure-bonded printed material, and then cuts the long pressure-bonded printed material into a predetermined size.

Process Cartridge

A process cartridge used in an apparatus for producing a printed material by an electrophotographic method will now be described.

A process cartridge according to an exemplary embodiment is equipped with a developing section that stores the electrostatic charge image developer of the exemplary embodiment and develops an electrostatic charge image on the surface of a photoreceptor into a pressure sensitive adhesive particle portion by using the electrostatic charge image developer, and is detachably attached to the apparatus for producing a printed material.

The process cartridge of this exemplary embodiment may be configured to include a developing section and, if needed, at least one selected from a photoreceptor, a charging section, an electrostatic charge image forming section, a transfer section, and other sections.

An example of the process cartridge is a cartridge in which a photoreceptor, and a charging roll (one example of the charging section), a developing device (one example of the developing section), and a photoreceptor cleaning device (one example of the cleaning section) disposed around the photoreceptor are integrated by a casing. The casing has an opening to allow exposure. The casing has an installation rail, and the process cartridge is installed to the apparatus for producing a printed material by using the installation rail.

EXAMPLES

The exemplary embodiments of the present disclosure will now be described in detail through examples, but the present disclosure is not limited by these examples. In the description below, "parts" and "%" are on a mass basis unless otherwise noted.

Example A

Preparation of Resin Particles for Core
Preparation of Resin Particle Dispersion (A1) for Core
  Styrene: 440 parts
  n-Butyl acrylate: 130 parts
  Acrylic acid: 20 parts
  Dodecanethiol: 5 parts
  The above-described components are mixed and dissolved to prepare a solution A.

In 250 parts of ion exchange water, 10 parts of an anionic surfactant (DOWFAX 2A1 produced by The Dow Chemical Company) is dissolved, and is dispersed and emulsified in a flask by adding the solution A to obtain an emulsion (monomer emulsion A).

In 555 parts of ion exchange water, 1 part of the same anionic surfactant (DOWFAX 2A1 produced by The Dow Chemical Company) is dissolved. The resulting solution is charged into a polymerization flask. A reflux duct is installed to the polymerization flask, and the polymerization flask is heated on a water bath while injecting nitrogen under slow stirring up to 75° C., and is retained thereat.

In 43 parts of ion exchange water, 9 parts of ammonium persulfate is dissolved, and the resulting solution is added dropwise to the aforementioned polymerization flask containing the aqueous anionic surfactant solution over a period of 20 minutes via a metering pump. Then, the monomer emulsion A is added dropwise thereto over a period of 200 minutes via a metering pump.

Subsequently, while stirring is continued, the polymerization flask is retained at 75° C. for 3 hours, and then the first stage polymerization is terminated. As a result, a resin particle dispersion (A1) precursor for core in which styrene resin particles having an volume-average particle diameter of 195 nm, a glass transition temperature of 53° C., and a weight-average molecular weight of 32,000 are dispersed is obtained.

Next, after the temperature has decreased to room temperature (25° C.), 240 parts of 2-ethylhexyl acrylate, 160 parts of n-butyl acrylate, 7 parts of decanethiol, and 1200 parts of ion exchange water are added to the polymerization flask containing the resin particle dispersion (A1) precursor for the core, and the resulting mixture is stirred slowly for 2 hours. Subsequently, while stirring is continued, the temperature is elevated to 70° C., and 4.5 parts of ammonium persulfate and 100 parts of ion exchange water are added thereto dropwise over a period of 20 minutes via a metering pump. Subsequently, while stirring is continued, the temperature is retained for 3 hours, and then the reaction is terminated. Through the aforementioned steps, a resin particle dispersion (A1) for the core, in which composite resin particles having a volume-average particle diameter of 240 nm, a weight-average molecular weight of 133,000, and a number-average molecular weight of 18,000 are dispersed and the solid content is adjusted to 30 mass % by addition of ion exchange water, is obtained.

The resin particles in the obtained resin particle dispersion (A1) for the core are dried, and the dried resin particles are embedded in an epoxy resin to prepare a sample. The sample is cut with a diamond knife to prepare a cross section piece of the resin particles. Next, the cut surface of the sample is stained in a ruthenium tetroxide steam, and then observed with a transmission electron microscope. The cross-sectional observation of the resin particles reveals that the resin particles have a structure in which multiple domains of a low-Tg (meth)acrylate resin are dispersed in a base material, a high-Tg styrene resin.

In addition, the glass transition temperature Tg behavior of the dried resin particles is analyzed with a differential scanning calorimeter (DSC) produced by Shimadzu Corporation from −150° C. to 100° C., and glass transition attributable to the low-Tg (meth)acrylate resin is observed at −59° C. In addition, glass transition attributable to a high-Tg styrene resin is observed at 53° C. (difference in glass transition temperature: 112° C.)

Preparation of Resin Particle Dispersions (A2 to A6) for Core

Resin particle dispersions (A2) to (A6) for the core in which the composite resin particles having a volume-average particle diameter in the range of 200 nm to 240 nm are dispersed and the solid content is adjusted to 30 mass % by addition of ion exchange water are obtained as with the resin particle dispersion (A1) for the core except that, when preparing the resin particle dispersion (A1) precursor for the core, the amount of dodecanethiol added is changed as indicated in Table 1 and that the amounts of 2-ethylhexyl acrylate and n-butyl acrylate added after preparation of the resin particle dispersion (A1) precursor for the core are changed as indicated in Table 1.

The weight-average molecular weight, the number-average molecular weight, and the difference in glass transition temperature of the composite resin particles contained in the resin particle dispersions (A2) to (A6) for the core are indicated in Table 1.

TABLE 1

| Resin particle dispersion for core | 2-Ethylhexyl acrylate | n-Butyl acrylate | Dodecanethiol | Weight-average molecular weight | Number-average molecular weight | Difference in glass transition temperature |
|---|---|---|---|---|---|---|
| (A1) | 240 parts | 160 parts | 5 parts | 133,000 | 18,000 | 112° C. |
| (A2) | 380 parts | 20 parts | 10 parts | 110,000 | 15,000 | 117° C. |
| (A3) | 320 parts | 80 parts | 25 parts | 125,000 | 17,000 | 113° C. |
| (A4) | 200 parts | 200 parts | 20 parts | 135,000 | 19,000 | 114° C. |
| (A5) | 80 parts | 320 parts | 30 parts | 142,000 | 21,000 | 102° C. |
| (A6) | 240 parts | 160 parts | 0 parts | 131,000 | 18,000 | 113° C. |

Preparation of Resin Particle Dispersion for Shell
Preparation of Resin Particle Dispersion (B1) for Shell
  Styrene: 450 parts
  n-Butyl acrylate: 135 parts
  Acrylic acid: 10 parts
  Dodecanethiol: 5 parts The above-described components are mixed and dissolved to prepare a solution B.

Meanwhile, in 250 parts of ion exchange water, 10 parts of an anionic surfactant (DOWFAX 2A1 produced by The Dow Chemical Company) is dissolved, and is dispersed and emulsified in a flask by adding the solution B to obtain an emulsion (monomer emulsion B).

In 555 parts of ion exchange water, 1 part of the same anionic surfactant (DOWFAX 2A1 produced by The Dow Chemical Company) is dissolved. The resulting solution is charged into a polymerization flask. A reflux duct is installed to the polymerization flask, and the polymerization flask is heated on a water bath while injecting nitrogen under slow stirring up to 75° C., and is retained thereat.

In 43 parts of ion exchange water, 9 parts of ammonium persulfate is dissolved, and the resulting solution is added dropwise to the aforementioned polymerization flask containing the aqueous anionic surfactant solution over a period of 20 minutes via a metering pump. Then, the monomer emulsion B is added dropwise thereto over a period of 200 minutes via a metering pump.

Subsequently, while stirring is continued, the polymerization flask is retained at 75° C. for 3 hours, and then the first stage polymerization is terminated. As a result, a resin particle dispersion (B1) for the shell, in which styrene resin particles having a volume-average particle diameter of 200 nm, a glass transition temperature of 53° C., a weight-average molecular weight of 33,000, and a number-average molecular weight of 15,000 are dispersed and the solid content is adjusted to 30 mass % by addition of ion exchange water, is obtained.

Preparation of Releasing Agent Dispersion
Preparation of Releasing Agent Dispersion (1)
  Fischer-Tropsch wax: 270 parts (trade name: FNP-0090 produced by Nippon Seiro Co., Ltd., melting temperature=90° C.)
  Anionic surfactant: 1.0 part
    (NEOGEN RK produced by DKS Co., Ltd.)
  Ion exchange water: 400 parts The aforementioned components are mixed, heated to 95° C., and dispersed in a homogenizer (ULTRA-TURRAX T50 produced by IKA Japan). The resulting dispersion is then dispersed in a Manton-Gaulin high-pressure homogenizer (produced by Gaulin Company) for 360 minutes to prepare a releasing agent dispersion (1) (solid component concentration: 20 mass %) containing dispersed releasing agent particles having a volume-average particle diameter of 0.23 μm.

Preparation of Transparent Pressure Sensitive Adhesive Base Particles
Preparation of Transparent Pressure Sensitive Adhesive Base Particles (A1)
  Resin particle dispersion (A1) for core: 600 parts
  Releasing agent dispersion (1): 10 parts
  Aqueous colloidal silica solution: 13 parts
    (SNOWTEX OS produced by Nissan Chemical Corporation)
  Ion exchange water: 1000 parts
  Anionic surfactant: 1 part
    (DOWFAX 2A1 produced by The Dow Chemical Company)

The above-described components serving as materials for forming the core are placed in a 3 L reactor equipped with a thermometer, a pH meter, and a stirrer, and the pH is adjusted to 3.0 by adding a 1.0 mass % aqueous nitric acid solution at a temperature of 25° C. Then, while the resulting mixture is dispersed in a homogenizer (ULTRA-TURRAX T50 produced by IKA Japan) at 5,000 rpm, 4 parts of a prepared 10 mass % aqueous polyaluminum chloride solution is added, and dispersing is conducted further for 6 minutes.

Subsequently, a stirrer and a heating mantle are attached to the reactor. The temperature is elevated at a temperature elevation rate of 0.2° C./minute up to a temperature of 40° C. and then at 0.05° C./minute beyond 40° C. while the rotation rate of the stirrer is adjusted so that the slurry is thoroughly stirred. The particle diameter is measured every 10 minutes with MULTISIZER II (aperture diameter: 50 μm, produced by Beckman Coulter Inc.). The temperature is retained when the volume-average particle diameter reached 7.5 μm, and 115 parts of the resin particle dispersion (B1) for the shell is added as a shell-forming material thereto over a period of 5 minutes. The temperature is held for 30 minutes, and then a 1 mass % aqueous sodium hydroxide solution is added thereto to adjust the pH to 6.0. Subsequently, while the pH is adjusted in the same manner to 6.0 every 5° C., the temperature is elevated at a temperature elevation rate of 1° C./minute up to 90° C., and the temperature is retained at 96° C. The particle shape and the surface property are observed with an optical microscope and a scanning electron microscope (FE-SEM), and coalescence of particles is confirmed 2.0 hours after retention at 96° C. is started. Thus, the reactor is cooled with cooling water over a period of 5 minutes to 30° C.

The cooled slurry is passed through a nylon mesh having an aperture of 30 μm to remove coarse particles, and the pressure sensitive adhesive base particle slurry that has passed through the mesh is filtered at a reduced pressure by using an aspirator. The pressure sensitive adhesive base particles remaining on the paper filter are manually pulverized as finely as possible and are added to ion exchange water in an amount ten times the amount of the pressure sensitive adhesive base particles at a temperature of 30° C. The resulting mixture is stirred for 30 minutes. Subsequently, the mixture is filtered at a reduced pressure with an aspirator, and the pressure sensitive adhesive base particles remaining on the paper filter are pulverized manually as finely as possible and are added to ion exchange water in an amount ten times the amount of the pressure sensitive adhesive base particles at a temperature of 30° C. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the pressure sensitive adhesive base particles. The washed pressure sensitive adhesive base particles are finely pulverized in a wet-dry-type particle sizer (Comil) and then vacuum-dried in a drier at 25° C. for 36 hours. As a result, transparent pressure sensitive adhesive base particles (A1) are obtained. The obtained transparent pressure sensitive adhesive base particles (A1) have a volume-average particle diameter of 8.5 μm, a weight-average molecular weight of 125,000, and a number-average molecular weight of 17,000. When the temperature T3 at which the transparent pressure sensitive adhesive base particles (A1) exhibit a viscosity of 10000 Pa·s at a pressure of 4 Mpa is measured and is found to be 69° C. The temperature difference (T1–T3) between the temperature T1 at which the viscosity is 10000 Pa·s at a pressure of 1 Mpa and the temperature T3 at which the viscosity is 10000 Pa·s at a pressure of 4 MPa is 17° C.

A section of the transparent pressure sensitive adhesive base particles (A1) is observed with a scanning electron microscope (SEM). A sea-island structure is observed. The transparent pressure sensitive adhesive base particle (A1) have a core in which island phases are present, and a shell layer in which no island phases are present. The sea phase contains a styrene resin, and the island phases contain a (meth)acrylate resin. The average size of the island phases is determined by the aforementioned measuring method. The average size of the island phases is indicated in Table 2.

Preparation of Transparent Pressure Sensitive Adhesive Base Particles (A2) to (A6)

Transparent pressure sensitive adhesive base particles (A2) to (A6) are prepared as with the transparent pressure sensitive adhesive base particles (A1) except that the resin particle dispersion for the core indicated in Table 2 is used instead of the resin particle dispersion (A1) for the core.

The weight-average molecular weight, the number-average molecular weight, the temperature T3, the temperature difference (T1–T3), and the average size of the island phases of the transparent pressure sensitive adhesive base particles (A2) to (A6) are measured, and the results are indicated in Table 2.

TABLE 2

| Transparent pressure sensitive adhesive base particles | Resin particle dispersion for core | Weight-average molecular weight | Number-average molecular weight | Temperature T3 | Temperature difference (T1 – T3) | Average size of island phases (nm) |
|---|---|---|---|---|---|---|
| (A1) | (A1) | 125,000 | 17,000 | 69° C. | 20° C. | 250 |
| (A2) | (A2) | 121,000 | 15,000 | 68° C. | 22° C. | 300 |
| (A3) | (A3) | 135,000 | 17,000 | 69° C. | 20° C. | 330 |
| (A4) | (A4) | 120,000 | 18,000 | 69° C. | 21° C. | 420 |
| (A5) | (A5) | ,138,000 | 19,000 | 71° C. | 19° C. | 390 |
| (A6) | (A6) | 124,000 | 17,000 | 68° C. | 20° C. | 350 |

Preparation of Externally Added Transparent Pressure Sensitive Adhesive Particles Preparation of Externally Added Transparent Pressure Sensitive Adhesive Particles (A1)

To 100 parts of the obtained transparent pressure sensitive adhesive base particles (A1), 1.3 parts of hydrophobic silica (RY50 produced by Nippon Aerosil Co., Ltd., average primary particle diameter: 40 nm) is added, and the resulting mixture is mixed in a sample mill at 13000 rpm for 30 seconds. The mixture is then screened through a vibrating screen having an aperture of 45 μm to obtain externally added transparent pressure sensitive adhesive particles (A1). The volume-average particle diameter of the obtained externally added transparent pressure sensitive adhesive particles (A1) is 8.6 μm.

The sulfur content and the water absorption percentage of the externally added transparent pressure sensitive adhesive particles (A1) are measured by the aforementioned methods, and the results are indicated in Table 3.

The temperature T1 and the temperature T2 of the externally added transparent pressure sensitive adhesive particles (A1) are measured by the aforementioned measuring method, the results thereof satisfy formula 1: "10° C.≤T1– T2".

The pressure sensitive adhesive particles (A1) are sprayed onto the entire image-formed surface of the postcard, which is a postcard paper V424 produced by Fuji Xerox Co., Ltd, so that the amount of the pressure sensitive adhesive particles (A1) provided is 6 g/m², and the postcard is passed through a belt roll-type fixing machine serving as a fixing device so as to fix the pressure sensitive adhesive particles onto the image-formed surface of the postcard and form a layer of the pressure sensitive adhesive particles. The postcard having a layer of the pressure sensitive adhesive particle on the image-formed surface is folded in two with the image-formed surface facing inward by using a sealer, PRESSLE multi II produced by Toppan Forms Co., Ltd., and a pressure is applied to the bi-folded recording medium so as to bond the flaps of the inner-side image-formed surface to each other at a pressure of 90 MPa.

Ten postcards serving as pressure-bonded printed materials are continuously formed by using the above-described apparatus under the above-described conditions by folding a postcard sheet in two with the image-formed surface facing inward and then bonding the image-formed surfaces of the flaps of the postcard sheet. The obtained pressure-bonded printed materials are left in a 28° C. 85% RH environment for one week and then presence/absence of warping in the pressure-bonded materials and the releasability between the pressure sensitive adhesive particle layers of the pressure-bonded printed materials are evaluated. The results indicate that no warping is found in the pressure-bonded printed materials. In addition, the releasability is excellent.

Preparation of Externally Added Transparent Pressure Sensitive Adhesive Particles (A2) to (A6)

Externally added transparent pressure sensitive adhesive particles (A2) to (A6) are prepared as with the externally added transparent pressure sensitive adhesive particles (A1) except that the transparent pressure sensitive adhesive base particles indicated in Table 3 are used instead of the transparent pressure sensitive adhesive base particles (A1).

The volume-average particle diameter, the sulfur content, and the water absorption percentage of the externally added transparent pressure sensitive adhesive particles (A2) to (A6) measured by the aforementioned methods are indicated in Table 3.

The temperature T1 and the temperature T2 of the externally added transparent pressure sensitive adhesive particles (A2) to (A6) are measured by the aforementioned measuring method, and all of the externally added transparent pressure sensitive adhesive particles satisfy formula 1: "10° C.≤T1−T2".

TABLE 3

| Externally added transparent pressure sensitive adhesive particles | Transparent pressure sensitive adhesive base particles | Volume-average particle diameter (µm) | Sulfur content (%) | Water absorption percentage (%) |
|---|---|---|---|---|
| (A1) | (A1) | 8.6 | 0.16 | 0.32 |
| (A2) | (A2) | 10.5 | 0.23 | 0.51 |
| (A3) | (A3) | 11.8 | 0.30 | 0.72 |
| (A4) | (A4) | 13.8 | 0.45 | 1.2 |
| (A5) | (A5) | 11.2 | 0.52 | 1.7 |
| (A6) | (A6) | 11.2 | 0.09 | 0.17 |

Preparation of Developer
Preparation of Developer (A1)

In a V blender, 8 parts of the externally added transparent pressure sensitive adhesive particles (A1) and 100 parts of the carrier (1) described below are mixed to prepare a developer (A1).
Preparation of Carrier (1)
  Ferrite particles (average particle diameter: 36 µm): 100 parts
  Toluene: 14 parts
  Styrene-methyl methacrylate copolymer: 2 parts
  (Component ratio: 90/10, Mw=80000)
  Carbon black (R330 produced by Cabot Corporation): 0.2 parts First, the aforementioned components other than the ferrite particles are stirred with a stirrer for 10 minutes to prepare a dispersed coating solution, and then this coating solution and the ferrite particles are placed in a vacuum deaerator-type kneader. After the resulting mixture is stirred for 30 minutes at 60° C., the pressure is reduced to perform deaeration under further heating, and the mixture is dried to obtain a carrier.

Preparation of Developers (A2) to (A6)

Developers (A2) to (A6) are prepared as with the developer (A1) except that the externally added transparent pressure sensitive adhesive particles indicated in Table 4 are used instead of the externally added transparent pressure sensitive adhesive particles (A1).

Evaluation

The obtained developers (namely, the developers (A1) to (A6)) are supplied to a fifth developing device of a modified model of Color1000 Press produced by Fuji Xerox Co., Ltd., having first to fourth developing devices loaded with color electrostatic charge image developers of cyan, magenta, yellow, and black in advance.

Recording sheets (OK Prince high-grade paper produced by Oji Paper Co., Ltd., water absorption percentage: 1.5 mass %) are set, an image (area density: 30%) containing both characters and photographic images is formed at a transparent pressure sensitive adhesive particle loading amount of 3 g/m$^2$, and the transparent pressure sensitive adhesive particles and images are fixed at a temperature of 170° C. and a pressure of 4.0 kg/cm$^2$. Regarding the order in which the pressure sensitive adhesive particle image is disposed, the transparent pressure sensitive adhesive particle image is disposed on top of the color images.

A recording sheet on which the transparent pressure sensitive adhesive particles and the color images are fixed is folded with the image-formed surface facing inward, and pressure-bonded with a modified model of a pressure-bonding sealer, PRESSLE LEADA produced by Toppan Forms Co., Ltd., so as to obtain a pressure-bonded printed material. The temperature during the pressure bonding is 20° C. and the pressure is 90 MPa.

The obtained pressure-bonded printed material is left in a 28° C., 85% RH environment for one week and then presence/absence of warping in the pressure-bonded material and the releasability between the pressure sensitive adhesive particle layers of the pressure-bonded printed material are evaluated. The evaluation of presence/absence of warping in the printed material is performed by visual observation. Evaluation of the releasability between the pressure sensitive adhesive particle layers of the printed material is performed by cutting a pressure-bonded printed material in a long side direction to prepare a rectangular sample having a width of 15 mm, separating the layers, and visually observing whether the color images have transferred to the opposing surface. The evaluation results regarding the presence/absence of warping in the printed materials (in the table, "Warping") and releasability (in the table, "Transfer onto opposing surface" are indicated in Table 4.

TABLE 4

| | Developer | Externally added transparent pressure sensitive adhesive particles | Transfer onto opposing surface | Warping |
|---|---|---|---|---|
| Example A1 | (A1) | (A1) | Not found | Substantially none |
| Example A2 | (A2) | (A2) | Not found | Substantially none |
| Example A3 | (A3) | (A3) | Not found | Substantially none |
| Example A4 | (A4) | (A4) | Not found | Substantially none |
| Comparative Example A1 | (A5) | (A5) | Found | Warping occurred |
| Comparative Example A2 | (A6) | (A6) | Not found | Warping occurred |

The aforementioned results reveal that, compared to Comparative Examples, Examples have less warping after pressure bonding.

Moreover, compared to Comparative Example A1, Examples have less transfer onto the opposing surface and better releasability. The reason why transfer onto the opposing surface occurs in Comparative Example A1 is probably that the high water absorbency of the transparent pressure sensitive adhesive particles has increased the tackiness.

Example B

Preparation of Dispersion Containing Styrene Resin Particles
Preparation of Styrene Resin Particle Dispersion (St1)
  Styrene: 390 parts
  n-Butyl acrylate: 100 parts
  Acrylic acid: 10 parts
  Dodecanethiol: 7.5 parts The above-described materials are mixed and dissolved to prepare a monomer solution.

In 205 parts of ion exchange water, 8 parts of an anionic surfactant (DOWFAX 2A1 produced by The Dow Chemical Company) is dissolved, and is dispersed and emulsified by adding the aforementioned monomer solution to obtain an emulsion.

In 462 parts of ion exchange water, 2.2 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube and is heated to 73° C. under stirring, and the temperature is retained thereat.

In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump.

Subsequently, while slow stirring is continued, the polymerization flask is retained at 75° C. for 3 hours, and then the temperature is returned to room temperature.

As a result, a styrene resin particle dispersion (St1) that contains styrene resin particles having a volume-average particle diameter (D50v) of 174 nm, a weight-average molecular weight of 49 k as determined by GPC (UV detection), and a glass transition temperature of 54° C., and that has a solid content of 42% is obtained.

The styrene resin particle dispersion (St1) is dried to obtain styrene resin particles, and the thermal behavior in the temperature range of −100° C. to 100° C. is analyzed with a differential scanning calorimeter (DSC-60A produced by Shimadzu Corporation). One glass transition temperature is observed. Table 5 indicates the glass transition temperatures.

Preparation of Styrene Resin Particle Dispersions (St2) to (St13)

Styrene resin particle dispersions (St2) to (St13) are prepared as with the preparation of the styrene resin particle dispersion (St1) except that the monomers are changed as indicated in Table 5.

In Table 5, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA

TABLE 5

Styrene resin particle dispersion

| No. | Polymerization component (mass ratio) | | | | | | | | D50v of resin particles nm | Mw (k) | Tg °C. |
|---|---|---|---|---|---|---|---|---|---|---|---|
| | St | BA | 2EHA | EA | 4HBA | AA | MAA | CEA | | | |
| St1 | 78 | 20 | 0 | 0 | 0 | 2 | 0 | 0 | 174 | 49 | 54 |
| St2 | 88 | 10 | 0 | 0 | 0 | 2 | 0 | 0 | 170 | 50 | 76 |
| St3 | 83 | 15 | 0 | 0 | 0 | 2 | 0 | 0 | 172 | 52 | 65 |
| St4 | 78 | 20 | 0 | 0 | 0 | 0 | 2 | 0 | 177 | 48 | 57 |
| St5 | 80 | 15 | 0 | 0 | 5 | 0 | 0 | 0 | 172 | 46 | 55 |
| St6 | 80 | 15 | 5 | 0 | 0 | 0 | 0 | 0 | 174 | 51 | 54 |
| St7 | 80 | 20 | 0 | 0 | 0 | 0 | 0 | 0 | 169 | 50 | 54 |
| St8 | 77 | 20 | 0 | 0 | 0 | 0 | 0 | 3 | 168 | 48 | 54 |
| St9 | 72 | 26 | 0 | 0 | 0 | 2 | 0 | 0 | 172 | 55 | 43 |
| St10 | 68 | 30 | 0 | 0 | 0 | 2 | 0 | 0 | 173 | 53 | 35 |
| St11 | 80 | 0 | 20 | 0 | 0 | 0 | 0 | 0 | 171 | 52 | 56 |
| St12 | 78 | 0 | 20 | 0 | 0 | 2 | 0 | 0 | 167 | 49 | 56 |
| St13 | 63 | 0 | 0 | 35 | 0 | 2 | 0 | 0 | 169 | 51 | 54 |

Preparation of Dispersion Containing Composite Resin Particles
Preparation of Composite Resin Particle Dispersion (M1)
  Styrene resin particle dispersion (St1): 1190 parts (solid content: 500 parts)
  2-Ethylhexyl acrylate: 250 parts
  n-Butyl acrylate: 250 parts
  Ion exchange water: 982 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask over a period of 60 minutes via a metering pump.

Subsequently, while slow stirring is continued, the polymerization flask is retained at 70° C. for 3 hours, and then the temperature is returned to room temperature.

As a result, a composite resin particle dispersion (M1) that contains composite resin particles having a volume-average particle diameter (D50v) of 219 nm and a weight-average molecular weight of 219 k as determined by GPC (UV detection) and that has a solid content of 32% is obtained.

described in Table 6 or that the polymerization components of the (meth)acrylate resin are changed as described in Table 6.

Preparation of Composite Resin Particle Dispersions (M22) to (M27)

Composite resin particle dispersions (M22) to (M27) are prepared as with the preparation of the composite resin particle dispersion (M1) except that the amounts of 2-ethylhexyl acrylate and n-butyl acrylate used are adjusted.

In Table 6, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA

TABLE 6

Composite resin particle dispersion

| | | St resin | | | Ac resin | Composite resin particles (or comparative resin particles) | | | |
| | | | | | | St resin/Ac | D50v of resin particles | Mw | Tg |
| No. | St resin particle dispersion | Polymerization component | Tg ° C. | | Polymerization component | resin mass ratio (St:Ac) | nm | (k) | ° C. ° C. |
|---|---|---|---|---|---|---|---|---|---|
| cM1 | St1 | St/BA/AA = 78/20/2 | 54 | | 2EHA = 100 | 50:50 | 222 | 230 | −50 54 |
| cM2 | St1 | St/BA/AA = 78/20/2 | 54 | | BA = 100 | 50:50 | 225 | 220 | −53 54 |
| cM3 | St12 | St/2EHA/AA = 78/20/2 | 56 | | BA = 100 | 50:50 | 224 | 212 | −53 56 |
| M1 | St1 | St/BA/AA = 78/20/2 | 54 | | 2EHA/BA = 50/50 | 50:50 | 219 | 219 | −52 54 |
| M2 | St2 | St/BA/AA = 88/10/2 | 76 | | 2EHA/BA = 50/50 | 50:50 | 218 | 240 | −52 76 |
| M3 | St3 | St/BA/AA = 83/15/2 | 65 | | 2EHA/BA = 50/50 | 50:50 | 220 | 231 | −52 65 |
| M4 | St4 | St/BA/MAA = 78/20/2 | 57 | | 2EHA/BA = 50/50 | 50:50 | 221 | 250 | −52 57 |
| M5 | St5 | St/BA/4HBA = 80/15/5 | 55 | | 2EHA/BA = 50/50 | 50:50 | 224 | 242 | −52 55 |
| M6 | St6 | St/BA/2EHA = 80/15/5 | 54 | | 2EHA/BA = 50/50 | 50:50 | 225 | 233 | −52 54 |
| M7 | St7 | St/BA = 80/20 | 54 | | 2EHA/BA = 50/50 | 50:50 | 224 | 243 | −52 54 |
| M8 | St8 | St/BA/CEA = 77/20/3 | 54 | | 2EHA/BA = 50/50 | 50:50 | 222 | 260 | −52 54 |
| M9 | St9 | St/BA/AA = 72/26/2 | 43 | | 2EHA/BA = 50/50 | 50:50 | 223 | 251 | −52 43 |
| M10 | St10 | St/BA/AA = 68/30/2 | 35 | | 2EHA/BA = 50/50 | 50:50 | 220 | 243 | −52 35 |
| M11 | St11 | St/2EHA = 80/20 | 56 | | 2EHA/BA = 50/50 | 50:50 | 221 | 249 | −52 56 |
| M12 | St12 | St/2EHA/AA = 78/20/2 | 56 | | 2EHA/BA = 50/50 | 50:50 | 227 | 237 | −52 56 |
| M13 | St12 | St/2EHA/AA = 78/20/2 | 56 | | 2EHA/HA = 50/50 | 50:50 | 224 | 226 | −55 56 |
| M14 | St13 | St/EA/AA = 63/35/2 | 54 | | 2EHA/PA = 50/50 | 50:50 | 224 | 243 | −45 54 |
| M15 | St1 | St/BA/AA = 78/20/2 | 54 | | 2EHA/HA = 50/50 | 50:50 | 226 | 270 | −54 54 |
| M16 | St1 | St/BA/AA = 78/20/2 | 54 | | 2EHA/BA = 90/10 | 50:50 | 224 | 264 | −51 54 |
| M17 | St1 | St/BA/AA = 78/20/2 | 54 | | 2EHA/BA = 80/20 | 50:50 | 226 | 248 | −52 54 |
| M18 | St1 | St/BA/AA = 78/20/2 | 54 | | 2EHA/BA = 70/30 | 50:50 | 226 | 260 | −52 54 |
| M19 | St1 | St/BA/AA = 78/20/2 | 54 | | 2EHA/BA = 30/70 | 50:50 | 225 | 273 | −52 54 |
| M20 | St1 | St/BA/AA = 78/20/2 | 54 | | 2EHA/BA = 20/80 | 50:50 | 224 | 233 | −52 54 |
| M21 | St1 | St/BA/AA = 78/20/2 | 54 | | 2EHA/BA = 10/90 | 50:50 | 223 | 243 | −53 54 |
| M22 | St1 | St/BA/AA = 78/20/2 | 54 | | 2EHA/BA = 50/50 | 90:10 | 182 | 180 | −52 54 |
| M23 | St1 | St/BA/AA = 78/20/2 | 54 | | 2EHA/BA = 50/50 | 80:20 | 190 | 210 | −52 54 |
| M24 | St1 | St/BA/AA = 78/20/2 | 54 | | 2EHA/BA = 50/50 | 70:30 | 199 | 223 | −52 54 |
| M25 | St1 | St/BA/AA = 78/20/2 | 54 | | 2EHA/BA = 50/50 | 30:70 | 259 | 300 | −52 54 |
| M26 | St1 | St/BA/AA = 78/20/2 | 54 | | 2EHA/BA = 50/50 | 20:80 | 300 | 320 | −52 54 |
| M27 | St1 | St/BA/AA = 78/20/2 | 54 | | 2EHA/BA = 50/50 | 10:90 | 380 | 331 | −52 54 |

The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 6 indicates the glass transition temperatures.

Preparation of Composite Resin Particle Dispersions (M2) to (M21) and (cM1) to (cM3)

Composite resin particle dispersions (M2) to (M21) and (cM1) to (cM3) are prepared as with the preparation of the composite resin particle dispersion (M1) except that the styrene resin particle dispersion (St1) is changed as Preparation of Pressure Sensitive Adhesive Particle
Preparation of Pressure Sensitive Adhesive Particles (1) and Developer (1)

Composite resin particle dispersion (M1): 504 parts
Ion exchange water: 710 parts
Anionic surfactant (DOWFAX 2A1 produced by The Dow Chemical Company): 1 part The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C./minute beyond 40° C. The particle diameter is measured every 10 minutes with MULTISIZER II (aperture diameter: 50 μm, produced by Beckman Coulter Inc.). The temperature is retained when the volume-average particle diameter reached 5.0 μm, and 170 parts of the styrene resin particle dispersion (St1) is added thereto over a period of 5 minutes. After completion of addition, a temperature of 50° C. is held for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having an aperture of 15 μm to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, pressure sensitive adhesive base particles (1) is obtained. The volume-average particle diameter of the pressure sensitive adhesive base particles (1) is 8.0 μm.

One hundred parts of the pressure sensitive adhesive base particles (1) and 1.5 parts of hydrophobic silica (RY50 produced by Nippon Aerosil Co., Ltd.) are mixed, and the resulting mixture is mixed in a sample mill at 13000 rpm for 30 seconds. The mixture is then screened through a vibrating screen having an aperture of 45 μm. As a result, pressure sensitive adhesive particles (1) are obtained.

Using the pressure sensitive adhesive particle (1) as a sample, the thermal behavior in the temperature range of −150° C. to 100° C. is analyzed with a differential scanning calorimeter (DSC-60A produced by Shimadzu Corporation). Two glass transition temperatures are observed. Table 7 indicates the glass transition temperatures.

The temperature T1 and the temperature T2 of the pressure sensitive adhesive particles (1) are measured by the aforementioned measuring method, and the pressure sensitive adhesive particles (1) satisfy formula 1, "10° C.≤T1−T2".

A section of the pressure sensitive adhesive particle (1) is observed with a scanning electron microscope (SEM). A sea-island structure is observed. The pressure sensitive adhesive particle (1) has a core in which island phases are present, and a shell layer in which no island phases are present. The sea phase contains a styrene resin, and the island phases contain a (meth)acrylate resin. The average size of the island phases is determined by the aforementioned measuring method. The average size of the island phases is indicated in Table 7.

Into a V-type blender, 10 parts of the pressure sensitive adhesive particle (1) and 100 parts of the following resin-coated carrier are placed, and the resulting mixture is stirred for 20 minutes. Then the mixture is screened through a vibrating screen having an aperture of 212 μm to obtain a developer (1).

Mn—Mg—Sr ferrite particles (average particle diameter: 40 μm: 100 parts
Toluene: 14 parts
Polymethyl methacrylate: 2 parts
Carbon black (VXC72 produced by Cabot Corporation): 0.12 parts Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. This dispersion and the ferrite particles are placed in a vacuum deaerator-type kneader, and the resulting mixture is dried at a reduced pressure under stirring to obtain a resin-coated carrier.

Preparation of Pressure Sensitive Adhesive Particles (2) to (27) and Developers (2) to (27)

The pressure sensitive adhesive particles (2) to (27) and the developers (2) to (27) are prepared as with the preparation of the pressure sensitive adhesive particles (1) except that the composite resin particle dispersion and the styrene resin particle dispersion are changed as indicated in Table 7.

The temperature T1 and the temperature T2 of the pressure sensitive adhesive particles (2) to (27) are measured by the aforementioned measuring method, and all of the pressure sensitive adhesive particles (2) to (27) satisfy formula 1, "10° C.≤T1−T2".

Preparation of Comparative Pressure Sensitive Adhesive Particles (c1) to (c3) and Developers (c1) to (c3).

The pressure sensitive adhesive particles (c1) to (c3) and developers (c1) to (c3) are prepared as with the preparation of the pressure sensitive adhesive particles (1) except that the composite resin particle dispersion and the styrene resin particle dispersion are changed as indicated in Table 7.

Evaluation of Pressure-Induced Phase Transition

The temperature difference (T1−T3), which is the indicator of how easily the pressure sensitive adhesive particles undergo pressure-induced phase transition, is determined. For each pressure sensitive adhesive particle sample, the temperature T1 and the temperature T3 are measured with a Flowtester (CFT-500 produced by Shimadzu Corporation), and the temperature difference (T1−T3) is calculated. Table 7 indicates the temperature difference (T1−T3).

Evaluation of Adhesiveness

An apparatus of a type illustrated in FIG. 3 is prepared as the apparatus for producing a printed material. In other words, an apparatus for producing a printed material, the apparatus being equipped with a five-stand-tandem intermediate transfer-type printing section that performs application of the pressure sensitive adhesive particles of the exemplary embodiment and formation of color images on a recording medium, and a pressure bonding section that has a folding device and a pressurizing device is prepared.

The pressure sensitive adhesive particles of the exemplary embodiment (or the comparative pressure sensitive adhesive particles), a yellow toner, a magenta toner, a cyan toner, and a black toner are respectively placed in five developing devices in the printing section. Commercially available products produced by Fuji Xerox Co., Ltd., are used as the yellow toner, the magenta toner, the cyan toner, and the black toner.

Postcard paper V424 produced by Fuji Xerox Co., Ltd., is prepared as the recording medium.

The image to be formed on the postcard paper is an image having an area density of 30% in which black characters and a full-color photographic image are both contained. The image is formed on one surface of the postcard sheet.

The amount of the pressure sensitive adhesive particles of the exemplary embodiment (or comparative pressure sensitive adhesive particles) provided is 3 g/m$^2$ in an image-formed region of an image-formed surface of the postcard sheet.

The folding device is a device that folds the postcard sheet in two such that the surface on which the image is formed is arranged on the inner side.

The pressurizing device is to apply a pressure of 90 MPa.

Ten postcards are continuously formed by using the above-described apparatus under the above-described conditions by folding a postcard sheet in two with the image-formed surface facing inward and then bonding the image-formed surfaces of the flaps of the postcard sheet.

The tenth postcard is cut in the long side direction at a width of 15 mm to prepare a rectangular test piece, and the test piece is subjected to the 90 degrees peel test. The peeling speed of the 90 degrees peel test is set to 20 mm/minute, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Table 7.

A: 0.8 N or more
B: 0.6 N or more but less than 0.8 N
C: 0.4 N or more but less than 0.6 N
D: 0.2 N or more but less than 0.4 N
E: Less than 0.2 N

TABLE 7

| Pressure sensitive adhesive particles | Composite resin particle dispersion | Core Polymerization components of St resin | Polymerization components of Ac resin | St resin/Ac resin mass ratio (St:Ac) | Shell layer St resin particle dispersion |
|---|---|---|---|---|---|
| c1 | cM1 | St/BA/AA = 78/20/2 | 2EHA = 100 | 50:50 | St1 |
| c2 | cM2 | St/BA/AA = 78/20/2 | BA = 100 | 50:50 | St1 |
| c3 | cM3 | St/2EHA/AA = 78/20/2 | BA = 100 | 50:50 | St12 |
| 1 | M1 | St/BA/AA = 78/20/2 | 2EHA/BA = 50/50 | 50:50 | St1 |
| 2 | M2 | St/BA/AA = 88/10/2 | 2EHA/BA = 50/50 | 50:50 | St2 |
| 3 | M3 | St/BA/AA = 83/15/2 | 2EHA/BA = 50/50 | 50:50 | St3 |
| 4 | M4 | St/BA/MAA = 78/20/2 | 2EHA/BA = 50/50 | 50:50 | St4 |
| 5 | M5 | St/BA/4HBA = 80/15/5 | 2EHA/BA = 50/50 | 50:50 | St5 |
| 6 | M6 | St/BA/2EHA = 80/15/5 | 2EHA/BA = 50/50 | 50:50 | St6 |
| 7 | M7 | St/BA = 80/20 | 2EHA/BA = 50/50 | 50:50 | St7 |
| 8 | M8 | St/BA/CEA = 77/20/3 | 2EHA/BA = 50/50 | 50:50 | St8 |
| 9 | M9 | St/BA/AA = 72/26/2 | 2EHA/BA = 50/50 | 50:50 | St9 |
| 10 | M10 | St/BA/AA = 68/30/2 | 2EHA/BA = 50/50 | 50:50 | St10 |
| 11 | M11 | St/2EHA = 80/20 | 2EHA/BA = 50/50 | 50:50 | St11 |
| 12 | M12 | St/2EHA/AA = 78/20/2 | 2EHA/BA = 50/50 | 50:50 | St12 |
| 13 | M13 | St/2EHA/AA = 78/20/2 | 2EHA/HA = 50/50 | 50:50 | St12 |
| 14 | M14 | St/EA/AA = 63/35/2 | 2EHA/PA = 50/50 | 50:50 | St13 |
| 15 | M15 | St/BA/AA = 78/20/2 | 2EHA/HA = 50/50 | 50:50 | St1 |
| 16 | M16 | St/BA/AA = 78/20/2 | 2EHA/BA = 90/10 | 50:50 | St1 |
| 17 | M17 | St/BA/AA = 78/20/2 | 2EHA/BA = 80/20 | 50:50 | St1 |
| 18 | M18 | St/BA/AA = 78/20/2 | 2EHA/BA = 70/30 | 50:50 | St1 |
| 19 | M19 | St/BA/AA = 78/20/2 | 2EHA/BA = 30/70 | 50:50 | St1 |
| 20 | M20 | St/BA/AA = 78/20/2 | 2EHA/BA = 20/80 | 50:50 | St1 |
| 21 | M21 | St/BA/AA = 78/20/2 | 2EHA/BA = 10/90 | 50:50 | St1 |
| 22 | M22 | St/BA/AA = 78/20/2 | 2EHA/BA = 50/50 | 90:10 | St1 |
| 23 | M23 | St/BA/AA = 78/20/2 | 2EHA/BA = 50/50 | 80:20 | St1 |
| 24 | M24 | St/BA/AA = 78/20/2 | 2EHA/BA = 50/50 | 70:30 | St1 |
| 25 | M25 | St/BA/AA = 78/20/2 | 2EHA/BA = 50/50 | 30:70 | St1 |
| 26 | M26 | St/BA/AA = 78/20/2 | 2EHA/BA = 50/50 | 20:80 | St1 |
| 27 | M27 | St/BA/AA = 78/20/2 | 2EHA/BA = 50/50 | 10:90 | St1 |

| Pressure sensitive adhesive particles | Average size of island phases D50v μm | Pressure sensitive adhesive particles nm | Tg °C | Tg °C | Difference in Tg °C | T3 °C | Pressure-induced phase transfer (T1 − T3) °C | Adhesiveness |
|---|---|---|---|---|---|---|---|---|
| c1 | 8.0 | 600 | −50 | 54 | 104 | 95 | 3 | D |
| c2 | 8.0 | 550 | −53 | 54 | 107 | 93 | 4 | D |
| c3 | 11.0 | 570 | −53 | 56 | 109 | 93 | 4 | D |

TABLE 7-continued

| | | | | | | | | |
|---|---|---|---|---|---|---|---|---|
| 1 | 8.0 | 200 | −52 | 54 | 106 | 75 | 15 | A |
| 2 | 11.0 | 250 | −52 | 76 | 128 | 70 | 13 | A |
| 3 | 11.0 | 280 | −52 | 65 | 117 | 78 | 15 | A |
| 4 | 11.0 | 240 | −52 | 57 | 109 | 70 | 10 | A |
| 5 | 11.0 | 240 | −52 | 55 | 107 | 74 | 16 | A |
| 6 | 11.0 | 250 | −52 | 54 | 106 | 73 | 14 | A |
| 7 | 9.5 | 250 | −52 | 54 | 106 | 73 | 13 | A |
| 8 | 9.5 | 250 | −52 | 54 | 106 | 75 | 10 | A |
| 9 | 9.5 | 220 | −52 | 43 | 95 | 75 | 15 | A |
| 10 | 9.5 | 230 | −52 | 35 | 87 | 73 | 15 | A |
| 11 | 9.5 | 220 | −52 | 56 | 108 | 72 | 15 | A |
| 12 | 9.5 | 230 | −52 | 56 | 108 | 75 | 20 | A |
| 13 | 5.8 | 250 | −55 | 56 | 111 | 70 | 15 | A |
| 14 | 5.8 | 350 | −45 | 54 | 99 | 80 | 5 | B |
| 15 | 5.8 | 400 | −54 | 54 | 108 | 81 | 7 | B |
| 16 | 8.0 | 400 | −51 | 54 | 105 | 80 | 10 | B |
| 17 | 8.0 | 300 | −52 | 54 | 106 | 70 | 20 | A |
| 18 | 8.0 | 250 | −52 | 54 | 106 | 75 | 15 | A |
| 19 | 8.0 | 250 | −52 | 54 | 106 | 73 | 15 | A |
| 20 | 8.0 | 300 | −52 | 54 | 106 | 75 | 20 | A |
| 21 | 8.0 | 400 | −53 | 54 | 107 | 80 | 9 | B |
| 22 | 8.0 | 450 | −52 | 54 | 106 | 85 | 5 | C |
| 23 | 8.0 | 400 | −52 | 54 | 106 | 80 | 10 | B |
| 24 | 8.0 | 250 | −52 | 54 | 106 | 75 | 15 | A |
| 25 | 8.0 | 210 | −52 | 54 | 106 | 73 | 13 | A |
| 26 | 8.0 | 230 | −52 | 54 | 106 | 72 | 13 | A |
| 27 | 8.0 | 250 | −52 | 54 | 106 | 72 | 13 | A |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A particle conveying device comprising:
   a storage portion comprising pressure sensitive adhesive particles that have a pressure-induced phase transition property, and have a sulfur content in a range of 0.1 mass % or more and 0.5 mass % or less relative to the entire pressure sensitive adhesive particles as measured by X-ray fluorescence; and
   a conveying member that is disposed in the storage portion and rotates about a shaft that extends in one direction inside the storage portion to thereby convey the pressure sensitive adhesive particles in a direction along the shaft inside the storage portion,
   wherein the pressure sensitive adhesive particles include a sea phase containing a styrene resin and island-phases containing a (meth)acrylate resin and being disbursed in the sea phase, and an average size of the island phases is in a range 200 nm or more and 500 nm or less.

2. The particle conveying device according to claim 1, wherein the conveying member is a film auger.

3. The particle conveying device according to claim 1, wherein the conveying member is a coil auger.

4. The particle conveying device according to claim 1, further comprising a loosening member that loosens the pressure sensitive adhesive particles conveyed by the conveying member, the loosening member being disposed on a downstream side of the conveying member in a conveying direction.

5. The particle conveying device according to claim 1, wherein the pressure sensitive adhesive particles have at least two glass transition temperatures, and a difference between the lowest glass transition temperature and the highest glass transition temperature is 30° C. or more.

6. The particle conveying device according to claim 1, wherein the styrene resin contains a styrene and another vinyl monomer as polymerization components, and the (meth)acrylate resin that contains at least two (meth)acrylates as polymerization components, wherein a mass ratio of the (meth)acrylates relative to a total of the polymerization components of the (meth)acrylate resin is 90 mass % or more.

7. An image forming apparatus comprising:
   the particle conveying device according to claim 1; and
   an image forming unit that forms an image by using the pressure sensitive adhesive particles conveyed by the particle conveying device.

8. The delivery device according to claim 1, wherein the pressure-induced phase transition property means that the pressure sensitive adhesive particles satisfy Formula 1 below:

$$10° \text{C.} \leq T1-T2 \qquad \text{Formula 1;}$$

wherein, in Formula 1, T1 represents a temperature at which a viscosity of the pressure sensitive adhesive particles is 10000 Pa·s at a pressure of 1 Mpa, and T2 represents a temperature at which a viscosity of the pressure sensitive adhesive particles is 10000 Pa·s at a pressure of 10 Mpa.

9. The delivery device according to claim 1, wherein the pressure sensitive adhesive particles satisfy Formula 2 below:

$$5° \text{C.} \leq T1-T3 \leq 25° \text{C.} \qquad \text{Formula 2;}$$

wherein, in Formula 2, T1 represents a temperature at which a viscosity of the pressure sensitive adhesive particle is 10000 Pa·s at a pressure of 1 Mpa and T3 represents a temperatures at which a viscosity of the pressure sensitive adhesive particles is 10000 Pa·s at a pressure of 4 MP.

10. The delivery device according to claim 2, wherein the film auger comprises a film portion disposed on a side surface of the shaft, the film portion comprising a plurality of blades spaced apart in a depth direction of the delivery device.

11. The delivery device according to claim 10, wherein the film auger further comprises a stirring portion, the stirring portion comprising a plurality plate surfaces facing in the depth direction of the delivery device.

12. The delivery device according to claim 3, wherein the coil auger comprises a wire formed into a hollow spiral shape extending in a depth direction of the delivery device.

13. The particle conveying device according to claim 4, wherein the loosening member comprises a plurality of columnar rods.

14. The particle conveying device according to claim 13, further comprising a first spiral blade formed on a peripheral surface of the shaft and a second spiral blade formed on the peripheral surface of the shaft, the loosening member being disposed between the first spiral blade and the second spiral blade.

15. The delivery device according to claim 1, wherein a weight-average molecular weight of the (meth)acrylate resin is in a range of 50,000 or more to 250,000 or less.

* * * * *